United States Patent
Ogawa et al.

(10) Patent No.: US 7,956,925 B2
(45) Date of Patent: Jun. 7, 2011

(54) METHOD FOR READING OUT SIGNAL CHARGES FROM AN IMAGE SENSOR HAVING DIFFERENT EXPOSURE TIMES

(75) Inventors: Masahiro Ogawa, Osaka (JP); Kunihiro Imamura, Kyoto (JP); Mayu Nishikawa, Osaka (JP); Toshinobu Hatano, Kyoto (JP)

(73) Assignee: Panasonic Corporation, Osaka (JP)

( * ) Notice: Subject to any disclaimer, the term of this patent is extended or adjusted under 35 U.S.C. 154(b) by 822 days.

(21) Appl. No.: 11/666,759

(22) PCT Filed: Oct. 28, 2005

(86) PCT No.: PCT/JP2005/019889
§ 371 (c)(1),
(2), (4) Date: May 2, 2007

(87) PCT Pub. No.: WO2006/049098
PCT Pub. Date: May 11, 2006

(65) Prior Publication Data
US 2007/0273785 A1    Nov. 29, 2007

(30) Foreign Application Priority Data
Nov. 2, 2004 (JP) .................................. 2004-319148

(51) Int. Cl.
*H04N 5/235* (2006.01)
*G03B 7/00* (2006.01)

(52) U.S. Cl. ..................................... 348/362; 348/221.1

(58) Field of Classification Search ............... 348/225.1, 348/228.1, 296, 362–364, 221.1
See application file for complete search history.

(56) References Cited

U.S. PATENT DOCUMENTS

| | | | | |
|---|---|---|---|---|
| 5,546,127 A | * | 8/1996 | Yamashita et al. | 348/297 |
| 2004/0080652 A1 | | 4/2004 | Nonaka et al. | |
| 2005/0057674 A1 | * | 3/2005 | Krymski et al. | 348/296 |

FOREIGN PATENT DOCUMENTS

| | | |
|---|---|---|
| JP | 2-174470 | 7/1990 |
| JP | 7-95481 | 4/1995 |
| JP | 8-223488 A | 8/1996 |
| JP | 10-336525 A | 12/1998 |
| JP | 11-75118 | 3/1999 |
| JP | 2002-185864 | 6/2002 |
| JP | 2002-185864 A | 6/2002 |
| JP | 2002-281343 | 9/2002 |
| JP | 2002-290841 | 10/2002 |
| JP | 2003-143485 | 5/2003 |
| JP | 2004-064165 A | 2/2004 |
| JP | 2004-222154 | 8/2004 |

OTHER PUBLICATIONS

Machine English Translation of JP 10-336525 A (Published on Dec. 18, 1998).* Machine English Translation of JP 08-223488 A (Published on Aug. 30, 1996).*
Japanese Office Action issued in Japanese Patent Application No. JP 2006-542337 dated Nov. 2, 2010.
English translation of Chinese Office Action issued in Chinese Patent Application No. CN 200580038154.9, mailed Jul. 25, 2008.

* cited by examiner

*Primary Examiner* — Nelson D. Hernández Hernández
(74) *Attorney, Agent, or Firm* — McDermott Will & Emery LLP

(57) ABSTRACT

Suppress deterioration in picture qualities while achieving expansion in a dynamic range.
An image sensor readout method that reads out, from an area sensor where a plurality of image pickup elements are arranged in matrix, signal charges that are accumulated in the image pickup elements is constituted as follows. First, plural kinds of exposure time different in length from each other are set, and the exposure time is then individually allocated to each line of the area sensor. Next, the signal charges accumulated in the image pickup elements in the allocated exposure time are read out through a line unit of the area sensor. Then, the read out signal charges are synthesized through a screen unit of the area sensor.

14 Claims, 18 Drawing Sheets

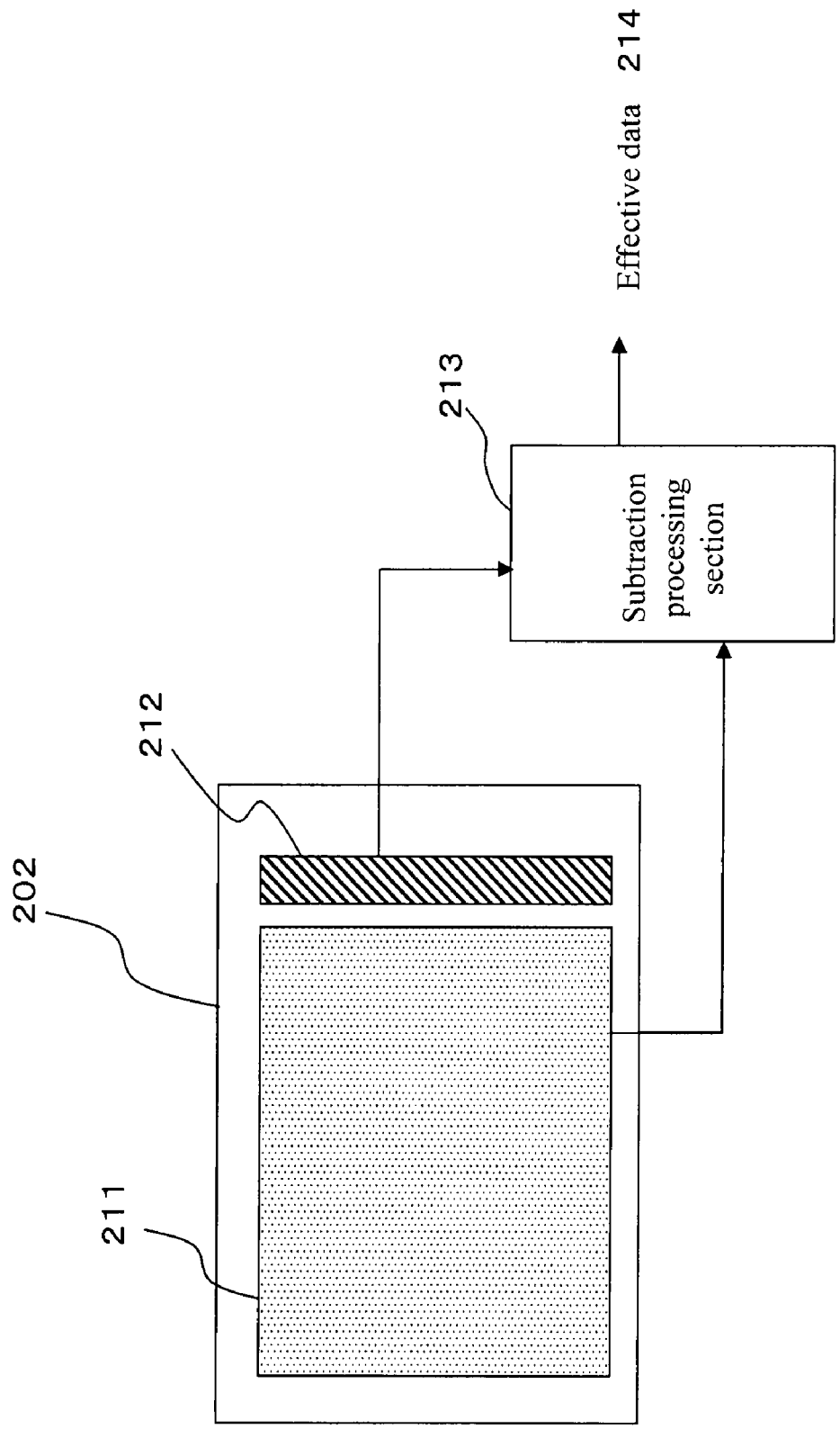

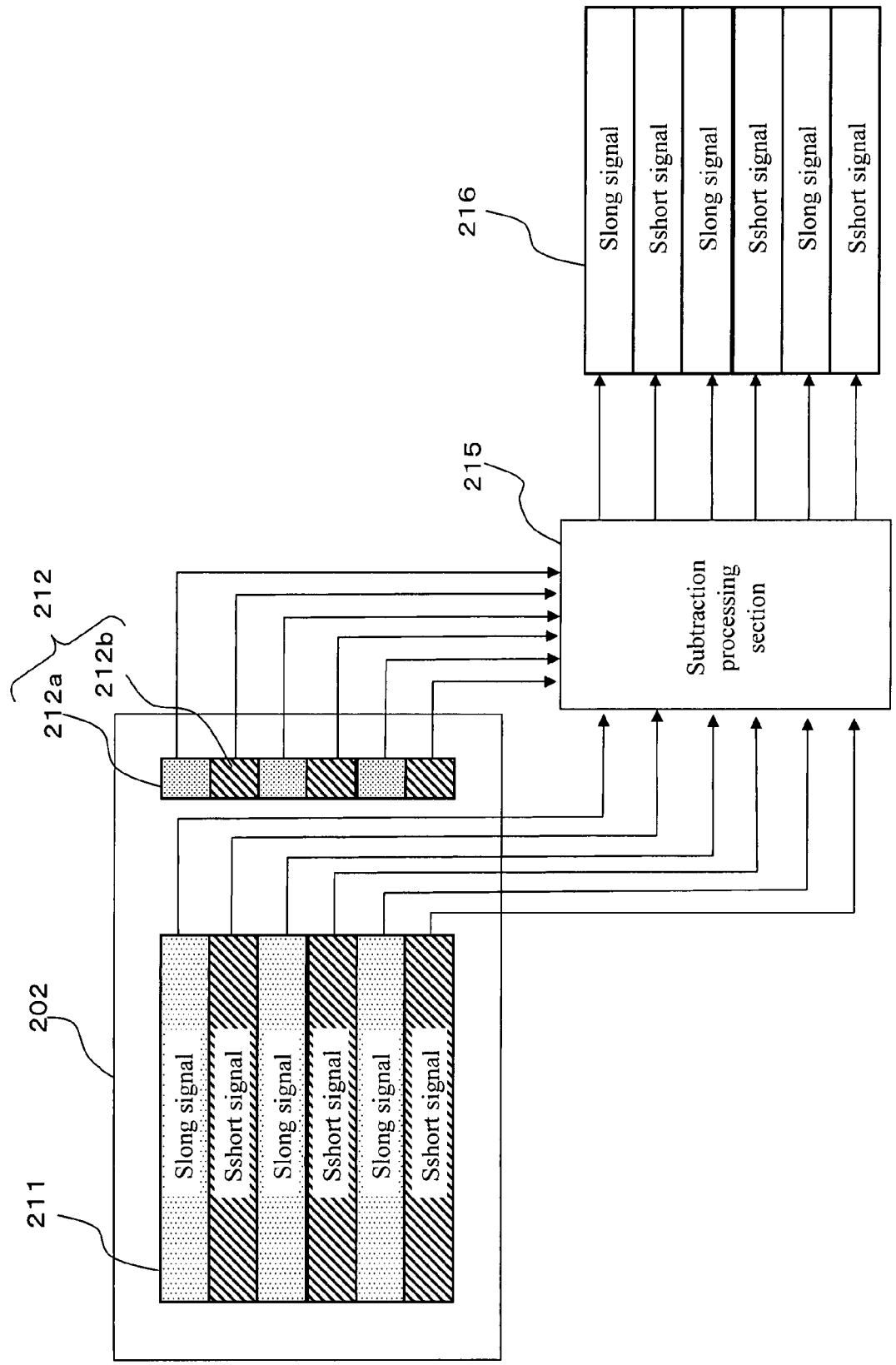

METHOD FOR READING OUT SIGNAL CHARGES FROM AN IMAGE SENSOR HAVING DIFFERENT EXPOSURE TIMES

RELATED APPLICATIONS

This application is the U.S. National Phase under 35 U.S.C. §371 of International Application No. PCT/JP2005/019889 filed on Oct. 28, 2005, which in turn claims the benefit of Japanese Application No. 2004-319148, filed on Nov. 2, 2004, the disclosures of which Applications are incorporated by reference herein.

TECHNICAL FIELD

The present invention relates to an image sensor, in particular, to an exposure time control technique for achieving wide dynamic range photographing which can finely capture image information of both bright part and dark part of an object that has both the bright part and the dark part.

BACKGROUND ART

A solid-state image pickup device for performing digital-processing on image data, e.g. a digital still camera that handles still picture, and a digital video camera that handles a dynamic picture, performs photoelectric-conversion on an optical image obtained through an image pickup optical system by a photoelectric conversion element, and performs digital-processing on the obtained image signal. As an area sensor where image pickup elements including the photoelectric conversion element and its accumulated charge retaining section are arranged in crosswise matrix, generally used are an MOS (Metal Oxide Semiconductor) image sensor and a CCD (Charge Coupled Device) image sensor. The effective incident light quantity of these area sensors is limited to a narrow area. Therefore, when an object with a large difference between light and shade is picked up by those area sensors, there are generated such a phenomenon in the bright part that the image is overexposed (referred to as whiteout hereinafter) and such a phenomenon in the dark part that black is crushed (referred to as black crushing hereinafter). This narrows the dynamic range of the image. In order to avoid such phenomena and widen the dynamic range of the image, conventionally, a long exposure signal and a short exposure signal are synthesized as depicted in Patent Literatures 1-3.

FIG. 16 is a characteristic chart that shows relations between the incident light quantities and the output signal levels of a long exposure signal Slong, a short exposure signal Sshort, and a composite signal Smix obtained by synthesizing those signals, respectively. A is an area with less incident light quantity, B is an area where saturation of the long exposure signal Slong starts, and C is an area where the long exposure signal Slong is completely saturated. In an image (object) with a significant difference between the light and shade, there are the areas A, B, and C mixed within the same image.

The long exposure signal Slong exerts an effect of improving the sensitivity of the area A (in the dark part with less incident light quantity), while generating a bad effect such as whiteout in the areas B and C (the bright part where the sensitivity is saturated). The short exposure signal Sshort exercises an effect of improving the sensitivity for the relatively bright part of the area object, while having a bad effect of generating the black crushing on the part with less light quantity. As described, the dynamic range is narrow when one of those signals is employed alone, and it is difficult to achieve clear image depiction of the image (object) with a significant difference between the light and shade (high contrast), which has the areas A, B, and C mixed in the same image.

Meanwhile, with the composite signal Smix obtained by adding the long exposure signal Slong and the short exposure signal Sshort, image information can be captured with less deflection over the area A to the area C, which allows a high contrast image to be depicted. That is, a wide dynamic range can be achieved.

Patent Literature 1: Japanese Unexamined Patent Publication H2-174470 (p. 2, FIG. 3)
Patent Literature 2: Japanese Unexamined Patent Publication H7-95481 (pp. 3-5, FIG. 2)
Patent Literature 3: Japanese Unexamined Patent Publication H11-75118 (p. 4-6, FIGS. 1-4)

DISCLOSURE OF THE INVENTION

Problems to be Solved by the Invention

In order to obtain the long exposure signal Slong and the short exposure signal Sshort, conventionally, as shown in FIG. 17, the time zone of one field is divided into two to carry out the long exposure in one of the time zone and carry out the short exposure in the other time zone. FIG. 17B schematically depicts image information of one field in the long exposure period. In this case, image pickup element groups of a line unit are long exposure signals Slong in all the lines. FIG. 17C schematically depicts image information of one field in the short exposure period. In this case, image pickup element groups of a line unit are short exposure signals Sshort in all the lines. Hereinafter, it will be described further referring to an image sensor as an example.

Provided that the timing for capturing the long exposure signal Slong in an arbitrary line is t1, and the timing for capturing the short exposure signal Sshort in the same line is t2, each can be expressed as Slong(t1) and Sshort(t2). The composite signal Smix of the long exposure signal Slong and the short exposure signal Sshort can generally be expressed as "Smix=Slong(t1)+Sshort(t2)".

It should be noted here that the time zone t1 and the time zone t2 are shifted from each other in terms of the time, though the two are within the same field period. Therefore, the exposure timing of the long exposure signal Slong(t1) and that of the short exposure signal Sshort(t2), which are each of the structural elements of a single composite signal Smix, are shifted largely from each other in terms of time. Thus, though no problem is caused when the object stands still or in small movement, deterioration is generated in the picture quality such as a blur or the like in the image when photographing a dynamic picture where the movement of the object is large, since the exposure time of the long exposure signal Slong(t1) and that of the short exposure signal Sshort, which constitute the readout signal information (composite signal Smix), become largely different.

Means for Solving the Problems

In order to overcome the aforementioned issues, the present invention constitutes as below the image sensor readout method that reads out signal charges that are accumulated in the image pickup elements, from an area sensor where a plurality of image pickup elements are arranged in matrix. That is, a plurality of exposure times different in time length from each other are set, and the exposure time is then individually allocated to each line of the area sensor. The signal charges accumulated in the image pickup elements in the allocated exposure time are read out at a line unit of the area sensor. The readout signal charges are synthesized at a screen unit of the area sensor.

When a composite signal is generated by synthesizing the accumulated signal charges of a plurality of lines where the exposure time is varied by a line unit, the plurality of lines as the sources for the synthesis are very close to each other in terms of time. Therefore, even in the case of photographing a dynamic picture to pick up an object under movement, it is possible to suppress deterioration generated in the picture quality such as blur in the image, while achieving expansion of the dynamic range.

EFFECTS OF THE INVENTION

According to the present invention, the exposure time is varied through a line unit. Therefore, even in the case of photographing a dynamic picture to pick up an object under movement, it is possible to suppress deterioration generated in the picture quality such as blur in the image, while achieving expansion of the dynamic range.

BRIEF DESCRIPTION OF THE DRAWINGS

FIG. 7 An illustration describing conventional OB subtraction processing;

FIG. 8 An illustration describing OB subtraction processing according to a third embodiment of the present invention;

DESCRIPTION OF REFERENCE NUMERALS

Figure 1:
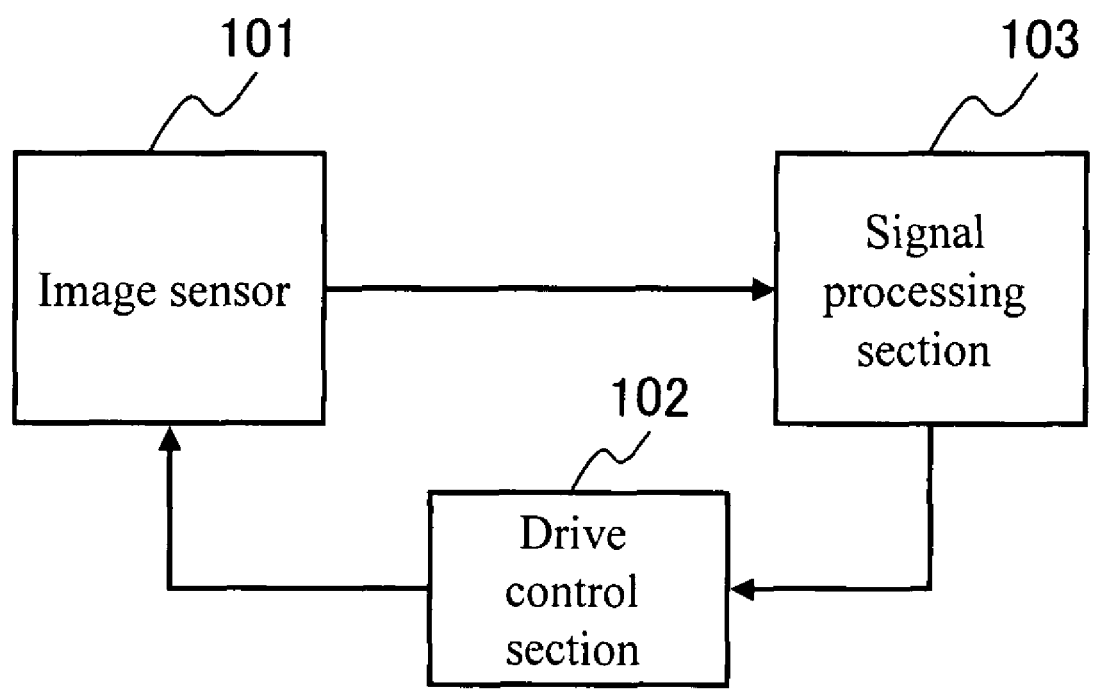
FIG. 1 A schematic diagram of a solid-state image pickup device that comprises an MOS image sensor of the present invention.

101 MOS image sensor
102 Drive control section
103 Signal processing section
201 Image pickup element
202 Area sensor
203 Vertical shift register (vertical control section)
204 Reset shift register (reset control section)
205 Reset mask control section
206 Signal charge readout control section
207 Horizontal shift register (horizontal control section)
210 Bayer-type filter array
211 Exposure area
212 OB pixel unit
212a, 212b OB pixel unit
213 Subtraction processing section
214 Effective data
215 Subtraction processing section
216 Effective data
217 Exposure coefficient control section
218 Subtraction processing section
219 Effective data
220 First adding processing section
221 Second adding processing section
222 Subtraction processing section
223 Effective data
224 Adding processing section
225 Subtraction processing section
226 Effective data
227 Integrating processing section
228 Gain control section
229 Integrating block data
230 Horizontal weight coefficient
231 Vertical weight coefficient
RD0 Readout timing reference signal
RD1-RD6 Readout timing signal RT0 Charge sweep-out pulse
RT1-RT6 Reset timing signal

BEST EMBODIMENT FOR CARRYING OUT THE INVENTION

Hereinafter, embodiments of an MOS image sensor according to the present invention will be described in detail referring to the accompanying drawings.

First Embodiment

FIG. 1 is a schematic diagram of a solid-state image pickup device that comprises an MOS image sensor according to a first embodiment of the present invention. The solid-state image pickup device comprises an MOS image sensor 101, a drive control section 102 for drive-controlling the image sensor 101, and a signal processing section 103 for processing the signal from the image sensor 101.

Figure 2:
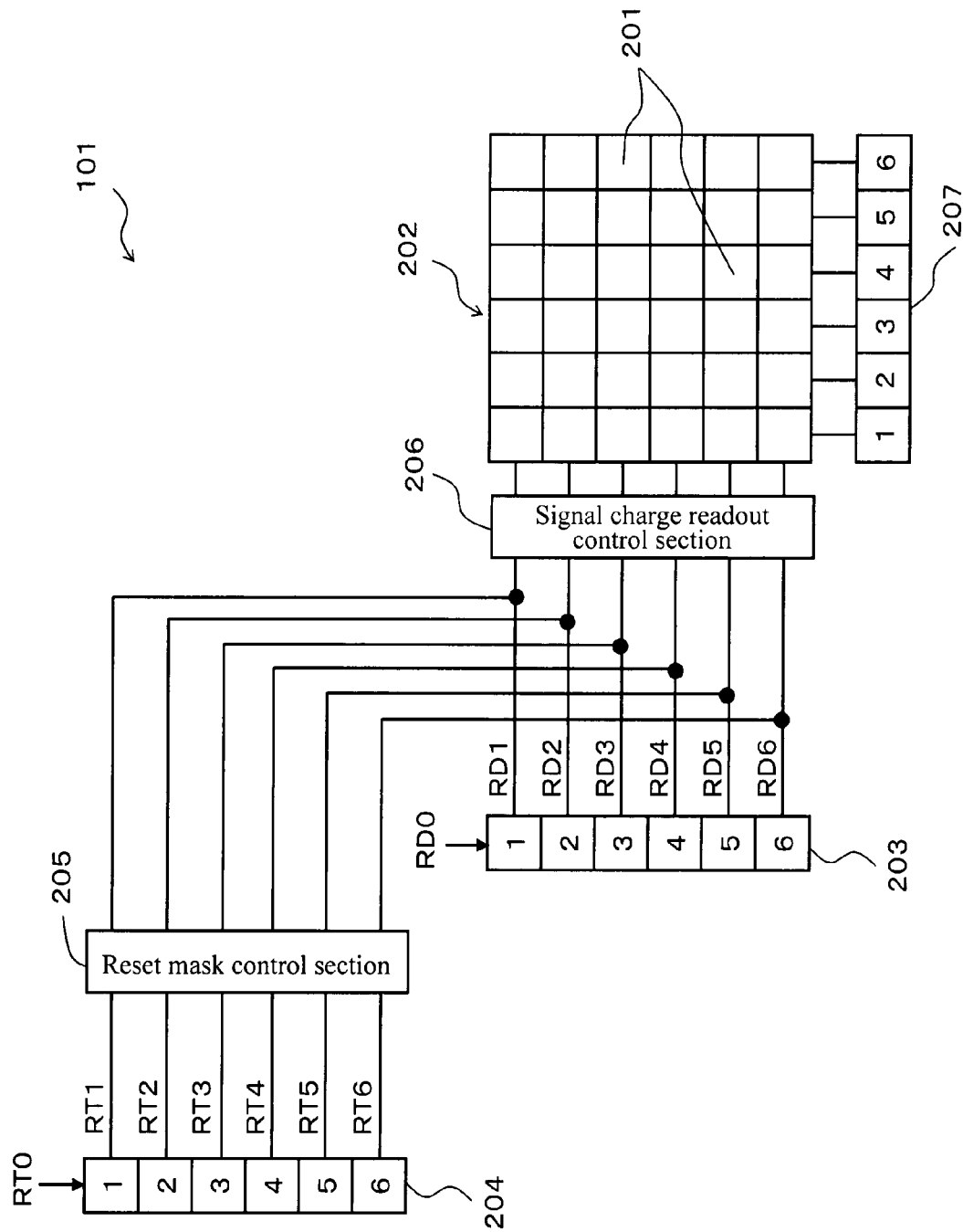
FIG. 2 A block diagram showing the detailed structure of the MOS image sensor according to a first embodiment of the present invention.

FIG. 2 is a block diagram showing the detailed structure of the image sensor 101. In FIG. 2, reference numeral 201 indicates an image pickup element, and 202 is an area sensor. Reference numeral 203 is a vertical shift register that functions as a vertical control section, and 204 is a reset shift register that functions as a reset control section. Reference numeral 205 is a reset mask control section, 206 is a signal charge readout control section, and 207 is a horizontal shift register. The vertical shift register 203, the reset shift register 204, the reset mask control section 205, and the horizontal shift register 207 constitute a timing control section.

The area sensor 202 is constituted with a great number of image pickup elements 201 arranged in crosswise matrix. The image pickup element 201 is constituted with a photoelectric conversion element, an accumulated charge retaining section, and a signal readout section. The vertical shift register 203 controls selection of the readout lines in reading out the accumulated signal charge of the image pickup elements 201 by a unit of line in the vertical direction. The signal charge readout control section 206 effectively controls selection of the readout lines in reading out the signal charge of the image pickup elements 201 by a unit of line in the vertical direction.

A readout timing reference signal RD0 is inputted to the vertical shift register 203. The vertical shift register 203 shifts the readout timing reference signal RD0 successively according to the time elapses so as to generate the readout timing signals RD1, RD2, RD3, - - - for each line and sends them to the signal charge readout control section 206.

A charge sweep-out pulse RT0, that resets the signal charge that is being accumulated by a line unit, is inputted to the reset shift register 204. The reset shift register 204 shifts the charge sweep-out pulse RT0 successively according to the time elapses so as to generate the reset timing signals RT1, RT2, RT3, - - - for each line and sends them to the signal charge readout control section 206. "Reset" herein means to sweep out the signal charge from the image pickup element 201 to set the accumulated charge of the image pickup element 201 as zero.

The reset mask control section 205 is interposed between the reset shift register 204 and the signal charge readout control section 206 to perform the output control of the reset timing signals RT1, RT2, RT3, - - - separately. That is, the reset mask control section 205 performs masking of the reset timing signals RT1, RT2, RT3, - - - separately to permit or inhibit the reset timing signals RT1, RT2, RT3, - - - to affect on the signal charge readout control section 206. The reset mask control section 205 can arbitrarily determine which of the reset timing signals RT1, RT2, RT3, - - - to be set valid or invalid.

The signal charge readout control section 206 performs sweep-out (reset) operation control of accumulated signal charge and readout operation control of the accumulated signal charge for all the lines, through handling a group of image pickup elements 201, - - - of one line in the area sensor 202 as a unit of control. That is, when a reset timing signal RTi (i is a natural number) is inputted from the reset shift register 204, the signal charge readout control section 206 reads out the signal charge accumulated in a group of image pickup elements 201 - - - from the area sensor 202 by a line unit, during the exposure time from the rise of the reset timing signal RTi to the rise of the readout timing signal RDi (i is a natural number). Meanwhile, when there is no input of the reset timing signal RTi, the signal charge readout control section 206 reads out the signal charge accumulated in a group of image pickup elements 201 - - - from the area sensor 202 by a line unit during the exposure time from the rise of the readout timing signal RDi to the rise of the readout timing signal RDi of the next cycle.

The readout operation of the accumulated signal charge is executed at the rise timing of the readout timing signal RD1 in each of the lines, and the charge reset operation is executed at the rise timing of the reset timing signal RTi in each of the lines. The electric charge of the group of image pickup elements 201 - - - in the line from which the accumulated signal charge is read out is reset.

The signal charge accumulated during the period from the rise of the readout timing signal RDi to the next rise thereof in the same line corresponds to the long exposure signal Slong. The charge-accumulating period in this case corresponds to the first exposure time (long exposure time). The exposure time (first exposure time) of the long exposure signal Slong is a period from the rise timing of the readout timing signal RDi to the next rise timing.

Further, when the reset timing RTi is inputted before the next rise, the signal charge readout control section 206 resets the electric charge of a group of image pickup elements 201 - - - in that line. The signal charge is accumulated from the reset timing till the rise timing of the next readout timing signal RDi (i=1, 2, - - - ), and the accumulated signal charge of the group of image pickup elements 201 - - - of the corresponding line is readout at that rise timing. The signal charge at this time corresponds to the short exposure signal Sshort. Hereinafter, the exposure time under this state is referred to as the second exposure time. The second exposure time is a period from the rise timing of the reset timing signal RTi to the rise timing of the next readout timing signal RDi.

The length of the first exposure time is set in accordance with the luminosity of the screen part that is judged relatively dark in the screen area of the area sensor 202. The length of the second exposure time is set in accordance with the luminosity of the screen part that is judged relatively bright in the screen area of the area sensor 202.

Even if the charge sweep-out pulse RT0 is shifted successively in the reset shift register 204 and the reset timing signals RT1, RT2, RT3, - - - are outputted in chronological order, the reset timing signal RTi (i is a natural number) in the line that is masked (masking valid line) by the reset mask control section 205 is not propagated to the signal charge readout control section 206. Therefore, only the readout timing signal RDi (i is a natural number) from the vertical shift register 203 becomes valid in the masking valid line, and the long exposure signal Slong based on the first exposure time is generated. In the meantime, in the line that is not masked (masking invalid line) by the reset mask control section 205, the corresponding reset timing signal RTi is propagated to the signal charge readout control section 206. Therefore, the reset timing signal RTi from the reset shift register 204 also becomes valid in the mask invalid line, and the short exposure signal Sshort based on the second exposure time is generated. In any case, the length of the exposure time is controlled separately at a line unit separately from each other.

As described above, the same time length of the first exposure time is set as that of the signal cycle of the readout timing reference signal RDi, and the time length of the second exposure time is set shorter than that of the signal cycle of the readout timing reference signal RDi.

Figure 4:
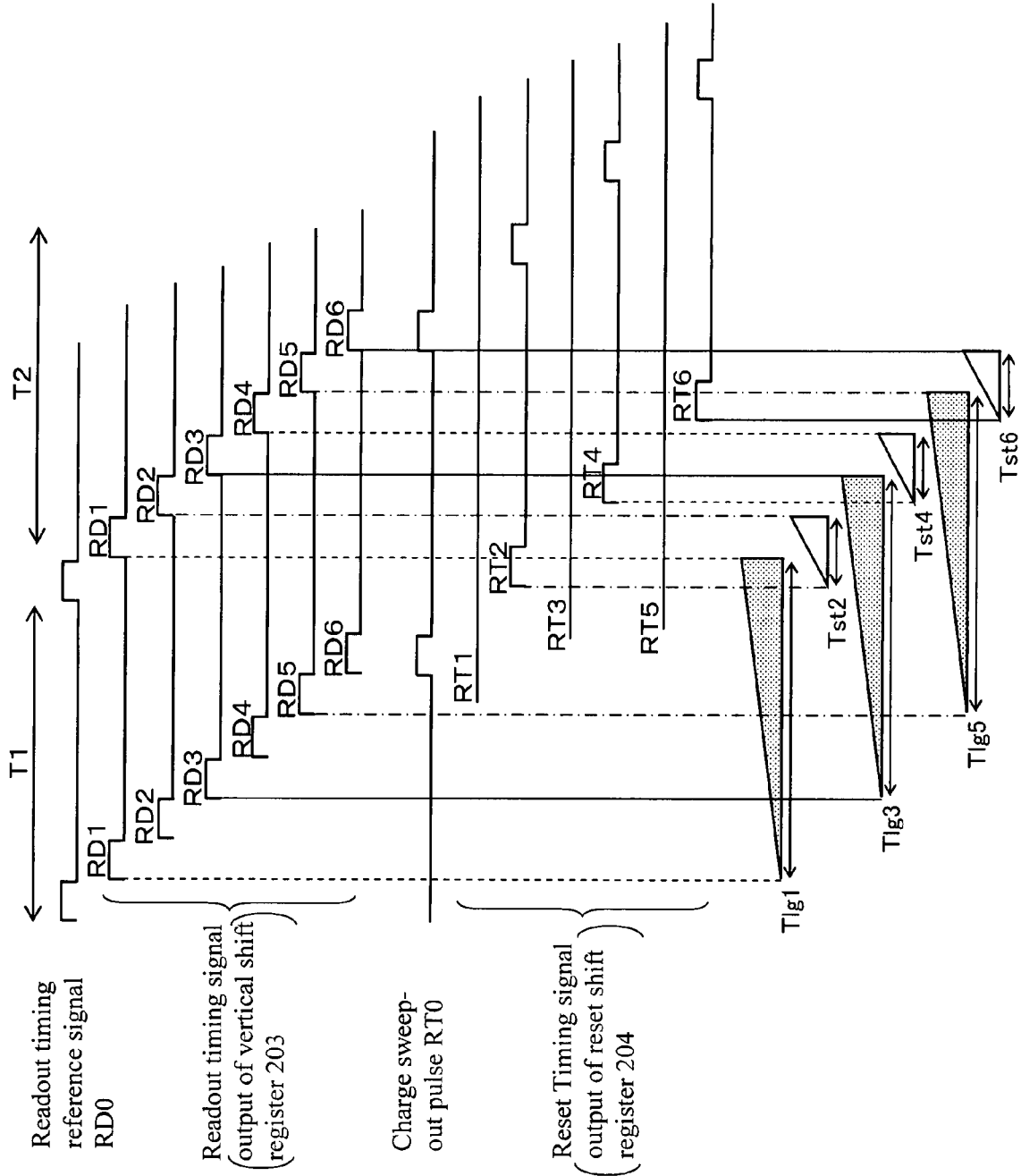
FIG. 4 A timing chart showing the operation at a mode characterized by the MOS image sensor according to the first embodiment (exposure control mode where the exposure time is set by each line)

The line group where the first exposure time is set is called a group of first line pairs. The line group where the second exposure time is set is called a group of second line pairs. The first and second line pairs are arranged alternately on the area sensor 202, as shown in FIG. 4 that is described next. Further, in the embodiment, the first and second line pairs are constituted with a single line or a plurality of lines. In first embodiment described below, it is assumed that each of the first and second line pairs is constituted with a single line.

The control of input timing of the readout timing reference signal RD0 for the vertical shift register 203, the control of input timing of the charge sweep-out pulse RT0 for the reset shift register 204, and the setting of the reset mask control section are performed by the drive control section 102 shown in FIG. 1.

The accumulated signal charge of the group of image pickup elements 201 - - - of the area sensor 202, i.e. the signal charge accumulated in the exposure time that is set separately by a line unit, is read out in the vertical direction by a line unit, and transferred vertically to the horizontal shift register 207. The horizontal shift register 207 transfers the transferred signal charge in the horizontal direction by each pixel, which is converted to a voltage signal by an output amplifier (not shown) and sent out to the signal processing section 103. This operation is repeated to read out the signal charges by one screen in order to generate an image.

In FIG. 2, the area sensor 202 is schematically shown with a group of image pickup elements 201 - - - of six rows in vertical direction and six columns in horizontal direction. In general, however, there are N-rows in the vertical direction and M-columns in the horizontal direction, where N and M are arbitrary natural numbers.

Figure 3:
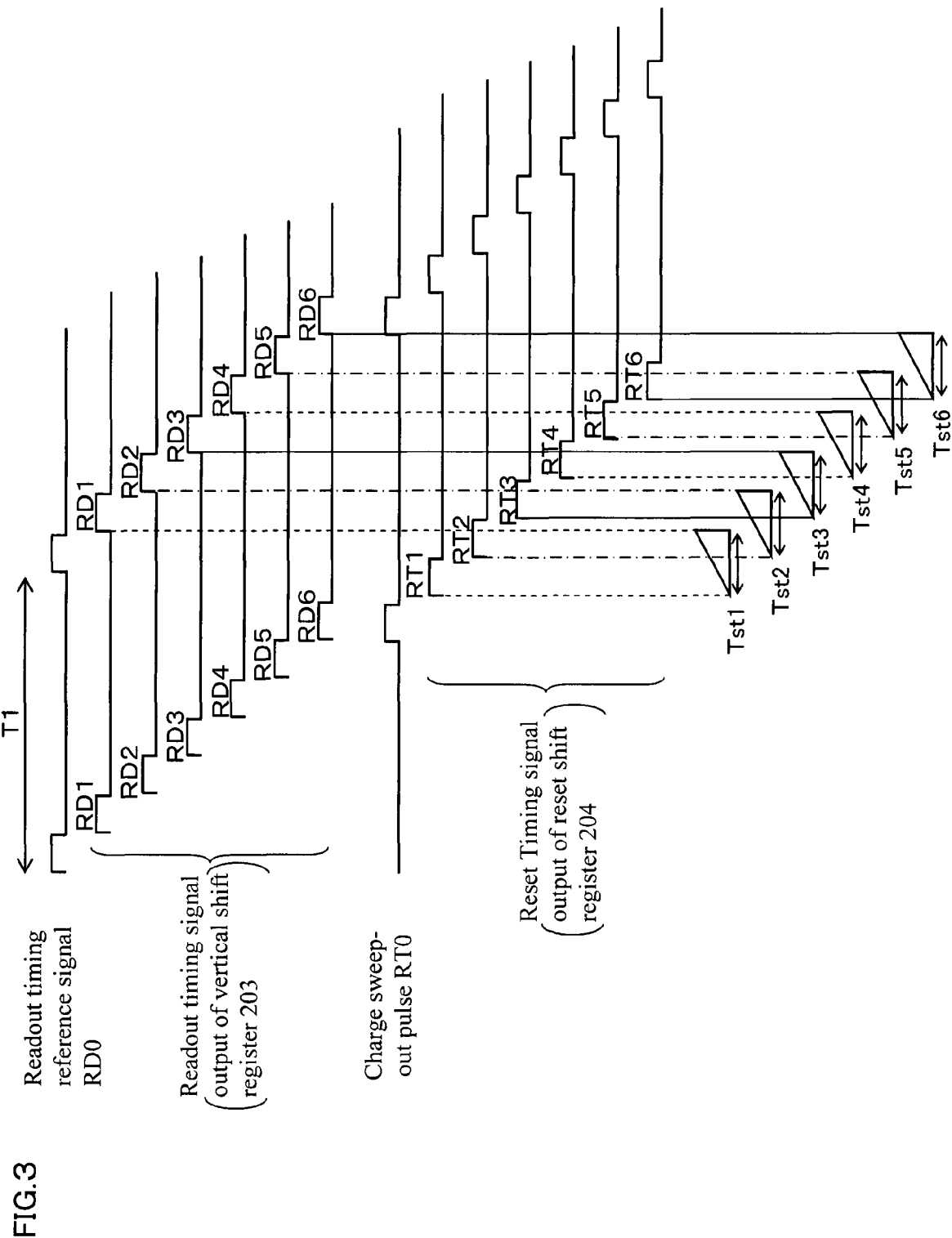
FIG. 3 A timing chart showing the operation of the MOS image sensor according to the first embodiment in a normal mode (exposure control mode where all lines are set in constant exposure time)

Hereinafter, the readout operation will be described in a more specific level.
(1) Exposure Control in Normal Mode where Constant Exposure Time is Set in all Lines First, the exposure control in a normal mode will be described referring to FIG. 3. The readout timing signal reference signal RD0 for generating the readout reference timing of the signal charge is inputted to the vertical shift register 203. The vertical shift register 203 generates the readout timing signals RD1, RD2, RD3, - - - by each line through shifting the readout timing reference signal RD0 successively. The cycle of the readout timing signal RD0 is referred to as T1 hereinafter.

The first line will be described in detail. The group of image pickup elements 201 - - - in the first line reset the accumulated signal charge by the rise of the preceding first readout timing signal RD1, and restarts accumulation of the signal charge. Then, the first reset timing signal RT1 rises before the rise of the first readout timing signal RD1 of the next cycle, and the signal charge accumulated so far is reset, and accumulation of the signal charge is restarted. The signal charge accumulated during this period is discarded.

After the rise of the first reset timing signal RT1, the first readout timing signal RD1 of the next cycle rises. This is illustrated with a small triangle in FIG. 3. The lateral axis of the triangle shows the time and the longitudinal axis thereof shows the exposure quantity. The exposure time under the exposed state indicated by the triangle of the first line is the second exposure time Tst1. The length of the second exposure time Tst1 is determined depending on at which timing the first reset timing signal RT1 is raised.

By the rise of the first readout timing signal RD1 indicating the end timing of the second exposure time Tst1, the accumulated signal charge of the second exposure time Tst1 of the group of image pickup elements 201 - - - in the first line is read out.

In the same manner described above, the accumulated signal charge of the second exposure time Tst2 from the rise of the second reset timing signal RT2 to the rise of the next second readout timing signal RD2 is read out.

Further, the accumulated signal charge of the second exposure time Tst3 from the rise of the third reset timing signal RT3 to the rise of the next third readout timing signal RD3 is read out.

Furthermore, the accumulated signal charge of the second exposure time Tst4 from the rise of the fourth reset timing signal RT4 to the rise of the next fourth readout timing signal RD4 is read out.

Thereafter, the same readout processing is executed for all the lines to read out the signal charges by one screen. As a result, the picked-up image by one screen is generated. In the above description, the second exposure time Tsti (i=1, 2, - - - ) is all the same for each line, and it is the time length with which the short exposure signal Sshort can be generated.
(2) Exposure Control in Mode where Exposure Time is Set by Each Line Next, referring to FIG. 4, the exposure control will be described in a mode where the exposure time is set with respect to each line. An example of the operation is described herein in the case where the exposure time of the odd-number lines is set to be long and the exposure time of the even-number lines is set to be short.

The readout timing signals RD1, RD2, RD3 - - - by each line are generated while shifting the readout timing reference signal RD0 by the vertical shift register 203. Further, the reset mask control section 205 carries out the setting to mask (masking valid) or not to mask (masking invalid) the reset timing signals RT1, RT2, RT3, - - - from the reset shift register 204. Here, "masking valid" is set for the odd-number lines and "masking invalid" is set for the even-number lines. In FIG. 4, the first reset timing signal RT1, the third reset timing signal RT3, and the fifth reset timing signal RT5 are fixed in a flat low level. Herewith, two kinds of exposure time are set on one screen. The exposure time of the odd-number lines where "masking valid" is set becomes equal to the cycle T1 of the readout timing reference signal RD0. The exposure time of the even-number lines where "masking invalid" is set becomes equal to the time from the rise of the reset timing signal RTi (i=1, 2, - - - ) to the rise of the readout timing signal RDi (i=1, 2, - - - ), like the case of (1) described above.

For the first line, the accumulated signal charge in the group of image pickup elements 201 - - - in the first line is reset by the rise of the preceding first readout timing signal RD1, and accumulation of the signal charge is restarted. There is no rise in the reset timing signal before the rise of the first readout timing signal RD1 of the next cycle, so that accumulation of the signal charge is continued. Thereafter, the first readout timing signal RD1 of the next cycle rises. The result of charge accumulation as described above is illustrated as a laterally long and narrow triangle in FIG. 4. The exposure time under the exposed state illustrated by the long and narrow triangle on the first line is the first exposure time Tlg1. The length of the first exposure time Tlg1 is equal to the cycle T1 of the readout timing reference signal RD0. By the rise of the first readout timing signal RD1 indicating the end timing of the first exposure time Tlg1, the accumulated signal charge of the first exposure time Tlg1 of the group of image pickup elements 201 - - - in the first line is read out. This corresponds to the long exposure signal Slong.

For the second line, the accumulated signal charge of the second exposure time Tst2 from the rise of the second reset timing signal RT2 to the rise of the next second readout timing signal RD2 is read out, as in the case of (1) described above. This corresponds to the short exposure signal Sshort.

For the third line, the accumulated signal charge of the first exposure time Tlg3 (=T1) from the rise of the third readout timing signal RD3 to the rise of the third readout timing signal RD3 of the next cycle is read out. This corresponds to the long exposure signal Slong.

For the fourth line, the accumulated signal charge of the second exposure time Tst4 from the rise of the fourth reset timing signal RT4 to the rise of the next fourth readout timing signal RD4 is read out, as in the case of (1) described above. This corresponds to the short exposure signal Sshort.

For the fifth line, the accumulated signal charge of the first exposure time Tlg5 (=T1) from the rise of the fifth readout timing signal RD5 to the rise of the fifth readout timing signal RD5 of the next cycle is read out. This corresponds to the long exposure signal Slong.

For the sixth line, the accumulated signal charge of the second exposure time Tst6 from the rise of the sixth reset timing signal RT6 to the rise of the next sixth readout timing signal RD6 is read out, as in the case of (1) described above. This corresponds to the short exposure signal Sshort.

By performing such exposure time control, the picked-up image equal to one screen is generated. The adjacent long exposure signal in the odd-number line and the short exposure signal in the even-number line are synthesized by the signal processing section 103.

Figure 17A:
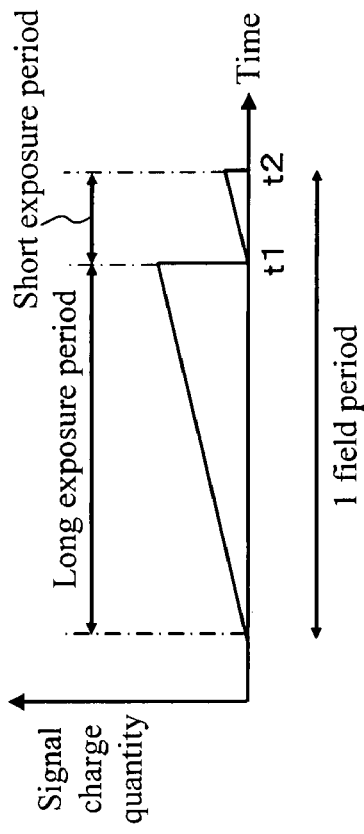
FIG. 17A An illustration describing the long exposure period and the short exposure period in one field period according to a conventional technique.
Figure 17C:
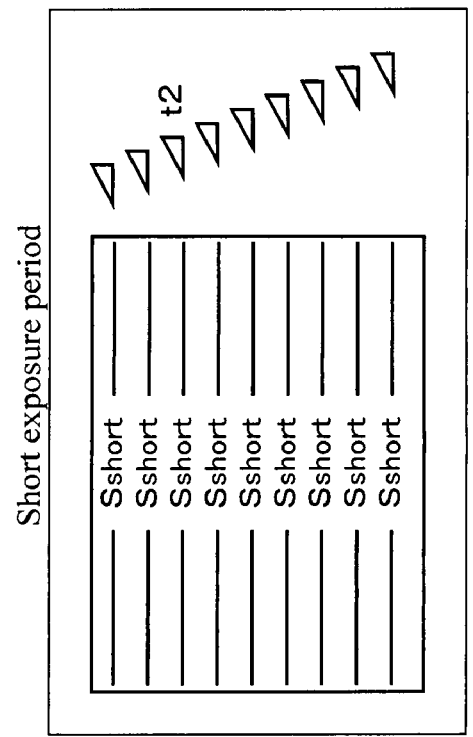
FIG. 17C An illustration describing the short exposure period in one field period according to the conventional technology.
Figure 17B:
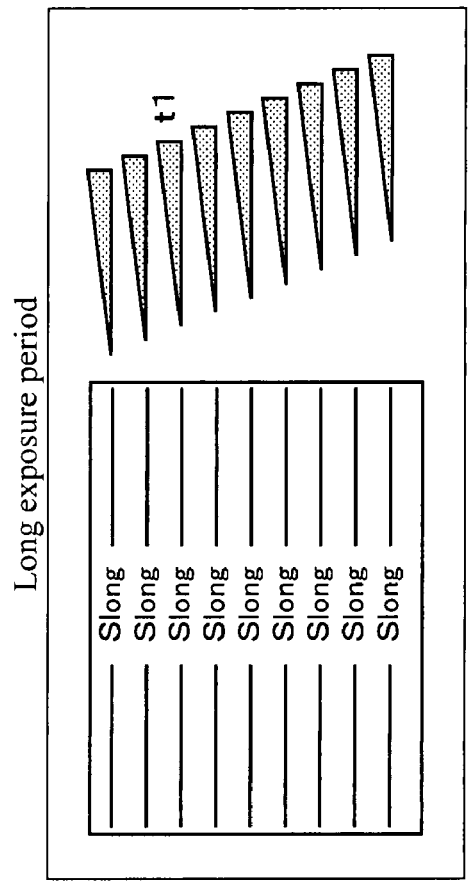
FIG. 17B An illustration describing the long exposure period in one field period according to the conventional technology.

As has been described in FIG. 17A-FIG. 17C, in the case of the conventional technique, the long exposure signal Slong and the short exposure signal Sshort, which are the structural elements of the composite signal Smix, are largely shifted in terms of time. Thus, there is a possibility of causing deteriorations in the picture quality such as a blur in the image in photographing the dynamic picture with an object of large movement.

Figure 5A:
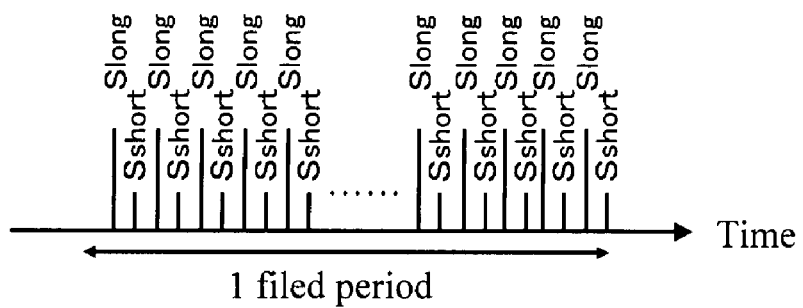
FIG. 5A A first illustration describing the long exposure and the short exposure in one field period according to the first embodiment of the present invention.
Figure 5B:
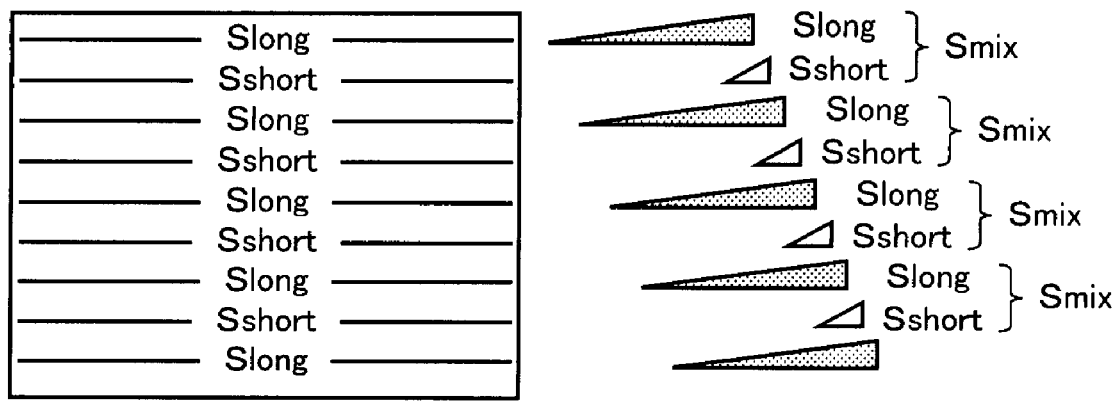
FIG. 5B A second illustration describing the long exposure and the short exposure in one field period according to the first embodiment of the present invention.

In the meantime, the time zone of one field in the first embodiment is divided into a large number of areas as shown in FIG. 5. Then, as shown in FIG. 5B, the adjacent first line pair and the second line pair are set. In FIG. 4, each of the first and second line pairs is constituted with a single line. However, those line pairs may be constituted with a plurality of lines.

Thereafter, the first exposure time where the long exposure signal Slong is outputted is set to the first line pair, and the second exposure time where the short exposure signal Sshort is outputted is set to the second line pair. Further, the long exposure signal Slong and the short exposure signal Sshort outputted from the adjacent first and second line pairs are synthesized. Thereby, the composite signal Smix is generated as a pair of the adjacent two lines. That is, the long exposure signal Slong and the short exposure signal Sshort constituting the composite signal are isolated only by the time of one line or several lines, and are very close to each other in terms of time. Thus, there is almost no deterioration generated in the picture quality such as a blur in the image, even in photographing the dynamic picture with an object of movement. Of course, wide dynamic range can be achieved as well.

In the first embodiment, a description is given of the control mode where the exposure time is changed alternately by each line. However, this is merely an example, and an arbitrary exposure time can be set for the arbitrary lines. It can be achieved by adjusting the input timing of the charge sweep-out pulse RT0 to the reset shift register 204, and arbitrarily setting the masked line and non-masked line in the reset mask control section 205.

Second Embodiment

Figures 6A, 6B:
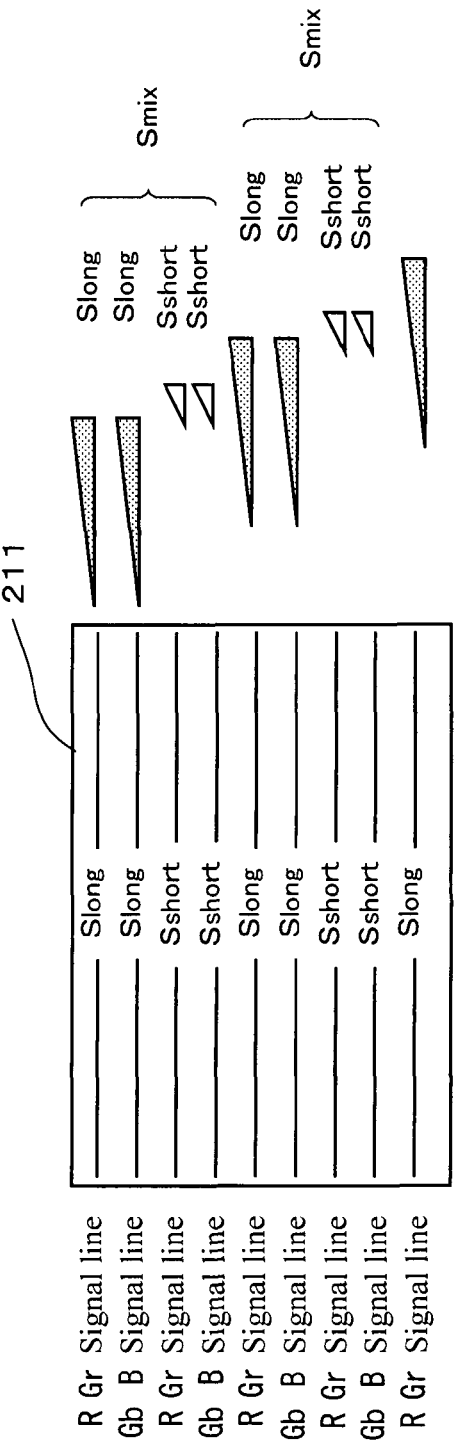
FIG. 6A An illustration describing a Bayer-type color filter array.
FIG. 6B An illustration of a first example of exposure time according to a second embodiment of the present invention.

FIG. 6A shows Bayer-type color filter array 210. The Bayer-type color filter array 210 is an example of a filter array that corresponds to the color filters based on three primary colors of the light (red, green, blue). In the Bayer-type color filter array 210, G pixel that is the main signal of the luminance signal requiring high resolution is indicated as pixel Gr and pixel Gb, and these pixels Gr and Gb are arranged alternately in the pixel array area of lattice pattern while providing a space of one pixel between them. Then, pixel R and pixel B are arranged alternately in those spaces.

In the Bayer-type color filter array 210, four pixels (2×2) of pixel Gr, pixel Gb, pixel R, and pixel B constitute a base unit. In the area sensor 202 having the Bayer-type color filter arrays 210, the color filter arrays 210 are arranged in an orderly manner.

As shown in FIG. 6B, in an exposure area 211 of the area sensor 202, there are set the first line pair consisting of the odd-number line and the even-number line adjacent to each other, and the second line pair consisting of the odd-number line and the even-number line adjacent to the first line pair. In the Bayer-type filter array 210 shown in FIG. 6A, the output signal of the pixels R and Gr is outputted from the odd-number lines of both the first and second line pairs, and the output signal of pixel Gb and B is outputted from the even-number lines of them.

Thus, the whole lines of the area sensor 202 are classified into the first line pairs and the second line pairs that are arranged alternately. Further, the exposure time where the long exposure signal Slong is outputted is set as the exposure time of the first line pair, and the exposure time where the short exposure signal Sshort is outputted is set as the exposure time of the second line pair. Furthermore, the time length of the first exposure time is set in accordance with the luminosity of the screen part that is judged as relatively dark in the screen area of the area sensor 202. The time length of the second exposure time is set in accordance with the luminosity of the screen part that is judged as relatively bright in the screen area of the area sensor 202.

Then, the processing for synthesizing the long exposure signal Slong outputted from the first line pair (for two lines) and the short exposure signal Sshort outputted from the second line pair (for two lines), i.e. the four-line synthesizing processing, is carried out. The first line pair and the second line pair whose exposure signals are synthesized are the line pairs adjacent to each other. Such four-line synthesizing processing is carried out over all the lines of the area sensor 202.

Here, the four-line synthesizing processing of the Bayer-type color filter 210 is performed as follows. As described above, the first and second line pairs that are set based on the Bayer-type color filter array 210 shown in FIG. 6A are constituted with the pair of odd-number line that outputs pixels R, Gr and the even-number line that outputs the pixels Gb, B. The four-line synthesizing processing is executed through adding the odd-number lines that output the same pixels, and adding the even-number lines that output the same pixels, respectively. Herewith, the four-line synthesizing processing of the Bayer-type filter array 201 is executed not by a line pair unit but by a line unit.

Herewith, the long exposure signal Slong(R) of R and the short exposure signal Sshort(R) of R are synthesized through the whole lines of the area sensor 202. Similarly, the long exposure signal Slong(B) of B and the short exposure signal Sshort(B) of B are synthesized. Likewise, the long exposure signal Slong(Gr) of Gr and the short exposure signal Sshort (Rr) of Rr are synthesized. Similarly, the long exposure signal Slong(Gb) of Gb and the short exposure signal Sshort(Rb) of Rb are synthesized. Herewith, the composite signal Smix of two line pairs consisting of the adjacent four lines is generated. Such composite signal Smix is generated through the whole lines of the area sensor 202.

Figure 6C:
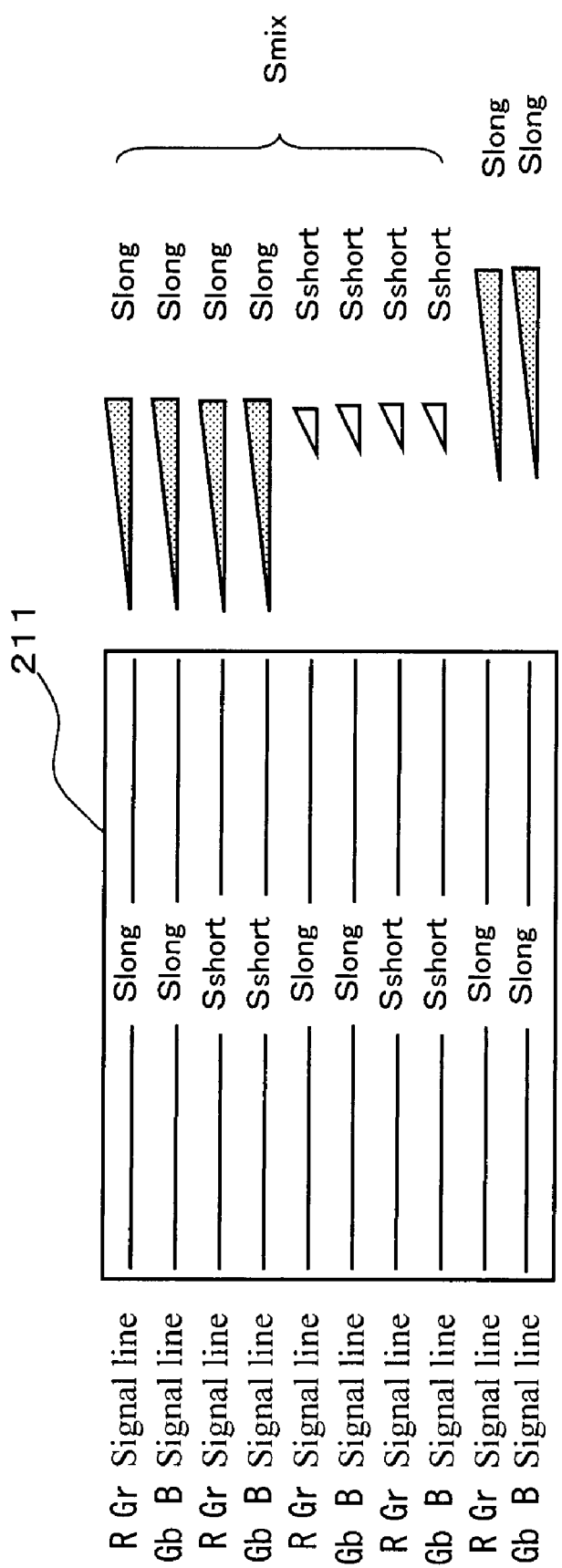
FIG. 6C An illustration of a second example of exposure time according to the second embodiment of the present invention.

The composite signals Smix generated thereby become the video signals that correspond to the Bayer-type color filter array 210 shown in FIG. 6A. The number of lines constituting each of the first and second line pairs may be any numbers of 2×n (n is a natural number). FIG. 6B shows the case of n=1. Further, FIG. 6C shows the case of n=2.

Hereinafter, other embodiments of the present invention, that are assumed to be corresponded to the Bayer-type color filter array 210 and the like, will be described. Before describing those embodiments, a description will be given of the inconvenience that is generated when the present invention is applied to the Bayer-type color filter array 210.

FIG. 7 shows the structure of a typical solid-state image pickup device. The solid-state image pickup device comprises an OB pixel section 212 and a subtraction processing section 213. In the area sensor 202 mounted to the solid-state image pickup device, electric charge is accumulated also in a part that is not exposed to the light. Thus, unnecessary electric charge is always added in the accumulation processing of the electric charge performed in the exposure area 211 of the area sensor 202. Therefore, the OB pixel section 212 is provided in a light-shield area of the area sensor 202 separately from the exposure area 210 of the area sensor 202. The signal outputted from the OB pixel section 212 is sampled to be a black reference signal (referred to as optical black or abbreviated as OB component hereinafter). The subtraction processing section 213 subtracts the B component from the output signal of the exposure area 211 to extract only the original signal (effective data 214).

In a conventional OB subtraction method, as shown in FIG. 7, the output (OB component) of the OB pixel section 212 is subtracted from the output signal of the exposure area 211 by a field unit so as to extract the effective data 214.

However, in the image sensor of the present invention, the exposure time is controlled every line. Thus, the level of the OB component also changes accordingly. Therefore, unlike the conventional case, it is not possible to carry out the subtraction processing by a field unit.

Each embodiment of the present invention, which has solved such inconvenience, will be described referring to the accompanying drawings.

Third Embodiment

A third embodiment of the present invention will be described referring to FIG. 8. The third embodiment is distinctive in terms of the processing of a subtraction processor 215. The long exposure signal Slong is supplied to the subtraction processor 215 from an OB pixel section 212a located on the first line pair. Further, the short exposure signal Sshort is supplied to the subtraction processor 215 from an OB pixel section 212b located on the second line pair. The long exposure signal Slong and the short exposure signal Sshort are supplied separately to the subtraction processing section 215.

The subtraction processing section 215 separately processes the output signals (the long exposure signal Slong, the short exposure signal Sshort) of the OB pixel sections 212a and 212b. That is, the subtraction processing section 215 separately and individually samples the output signals of each of the OB pixel sections 212a, 212b to generate the OB components that respectively correspond to the first and second line pairs. Further, the subtraction processing section 215 subtracts the OB component of the respective the line pair from the output signal of each line pair of the exposure area 211 so as to generate and output the effective data 216 that is the original exposure signal.

Although the processing for generating the OB component and subtracting the OB component from the output signal (the long exposure signal Slong, the short exposure signal Sshort) is performed with respect to each line unit, it may be performed by a line pair unit depending on the circumstances.

The effective data 216 is configured in a state where the long exposure signal Slong and the short exposure signal Sshort are separated. In the effective data 216 outputted from a subtraction processing section 218, the composite signal Smix is generated through performing the adding processing to the long exposure signal Slong and the short exposure signal Sshort by an adding processing section not shown. The adding processing of the long exposure signal Slong and the short exposure signal Sshort is performed between the adjacent first and second line pairs.

There are the following two methods for the sampling processing. The first method performs sampling after adding a plurality of OB components outputted from all of the OB pixel sections 212a provided in the group of first line pairs so as to generate the OB component corresponding to the long exposure signal Slong as the average OB(long)Ave. Similarly, the first method performs sampling after adding a plurality of OB components outputted from all of the OB pixel sections 212b provided in the group of second line pairs so as to generate the OB component corresponding to the short exposure signal Sshort as the average OB(short)Ave.

The second method performs sampling of the OB component individually for each line that outputs the long exposure signal Slong without adding the plurality of OB components outputted from all of the OB pixel sections 212a provided in the group of first line pairs so as to generate the OB component (long) with respect to each line that outputs the long exposure signal Slong. Similarly, the second method performs sampling of the OB component individually for each line that outputs the short exposure signal Sshort without adding the plurality of OB components outputted from all the OB pixel sections 212b provided for the group of second line pairs, thereby to generate the OB component (long) with respect to each line that outputs the short exposure signal Sshort.

The OB components may be generated by any of the above-described methods. However, according to the first method, it is possible to eliminate the influence of the noise.

Fourth Embodiment

Figure 9:
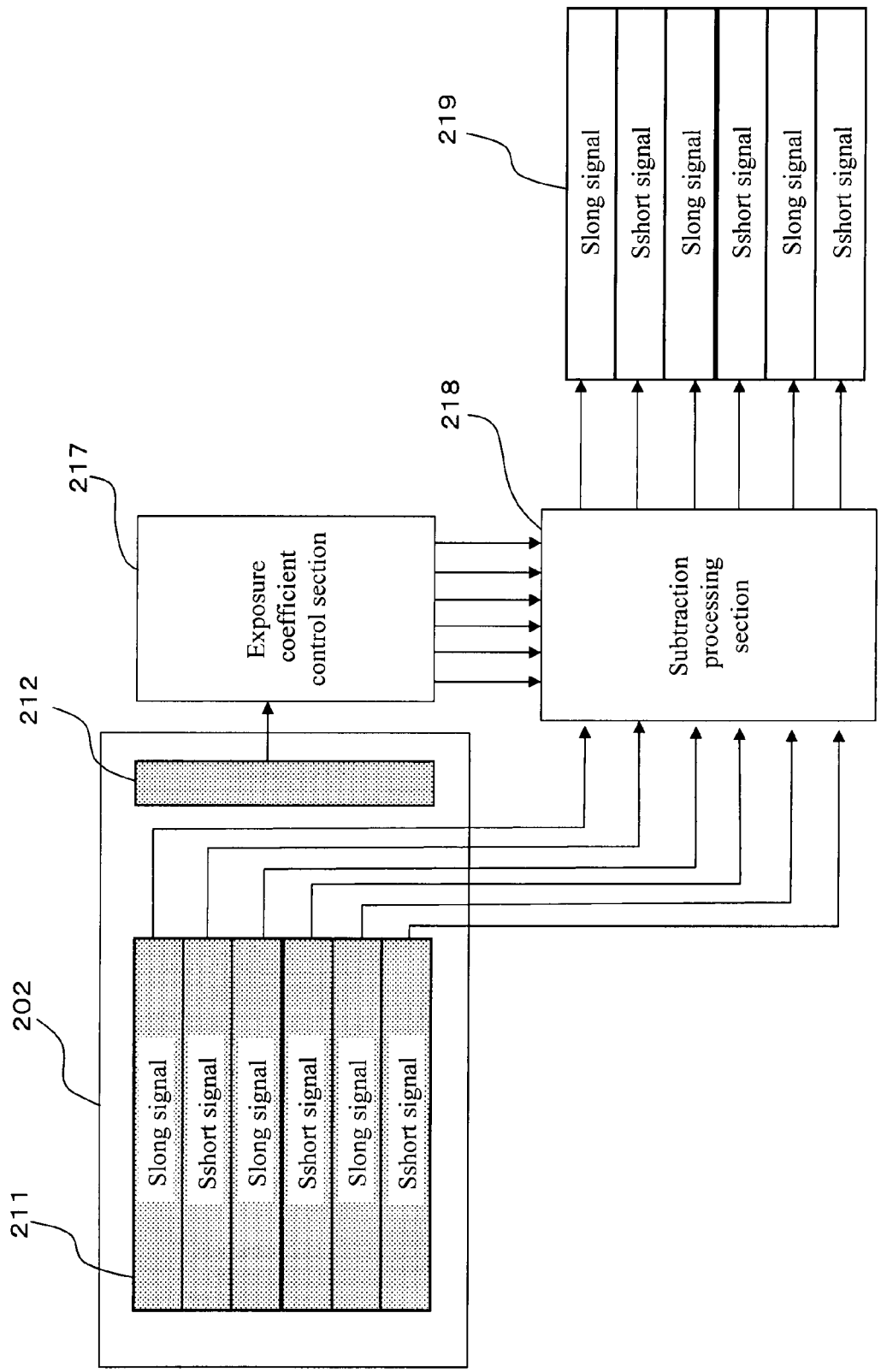
FIG. 9 An illustration describing OB subtraction processing according to a fourth embodiment of the present invention.

A fourth embodiment of the present invention will be described referring to FIG. 9. The fourth embodiment comprises an exposure coefficient control section 217 newly, and it is distinctive in terms of the contents of processing performed by the subtraction processing section 218.

The exposure coefficient control section 217 obtains the outputs of the OB pixel section 212 (OB components) not as a line pair unit but as a unit of whole field, and then averages the OB components in one field of the screen to perform sampling thereon so as to calculate the field average of the OB components. Further, the exposure coefficient control section 217 multiplies an independent coefficient K1 to the calculated field average of the OB components in the output line pair (first line pair) of the long exposure signal Slong and multiplies an independent coefficient K2 in the output line pair (second line pair) of the short exposure signal Sshort. Thereafter, the exposure coefficient control section 217 calculates the OB components of each line pair, and outputs the calculated OB components to the subtraction processing section 218.

The exposure coefficient control section 217 memorizes the independent coefficients K1 and K2 that is set in advance. The independent coefficients K1 and K2 are calculated based on the ratio between the exposure time of the output line pair (the first line pair) of the long exposure signal Slong and the exposure time of the output line pair (the second line pair) of the short exposure signal Sshort.

The subtraction processing section 218 subtracts the OB component corresponding to the respective line from the output signal of each line of the exposure area 210 so as to generate and output the effective data 219 that is the original exposure signal.

Furthermore, the effective data 219 is configured in the state where the long exposure signal Slong and the short exposure signal Sshort are separated. So, in the effective data 219 outputted from the subtraction processing section 218, the composite signal Smix is generated through performing the adding processing to the long exposure signal Slong and the short exposure signal Sshort by an adding processing section not shown. The adding processing of the long exposure signal Slong and the short exposure signal Sshort is performed between the adjacent first and second line pairs.

Fifth Embodiment

Figure 10:
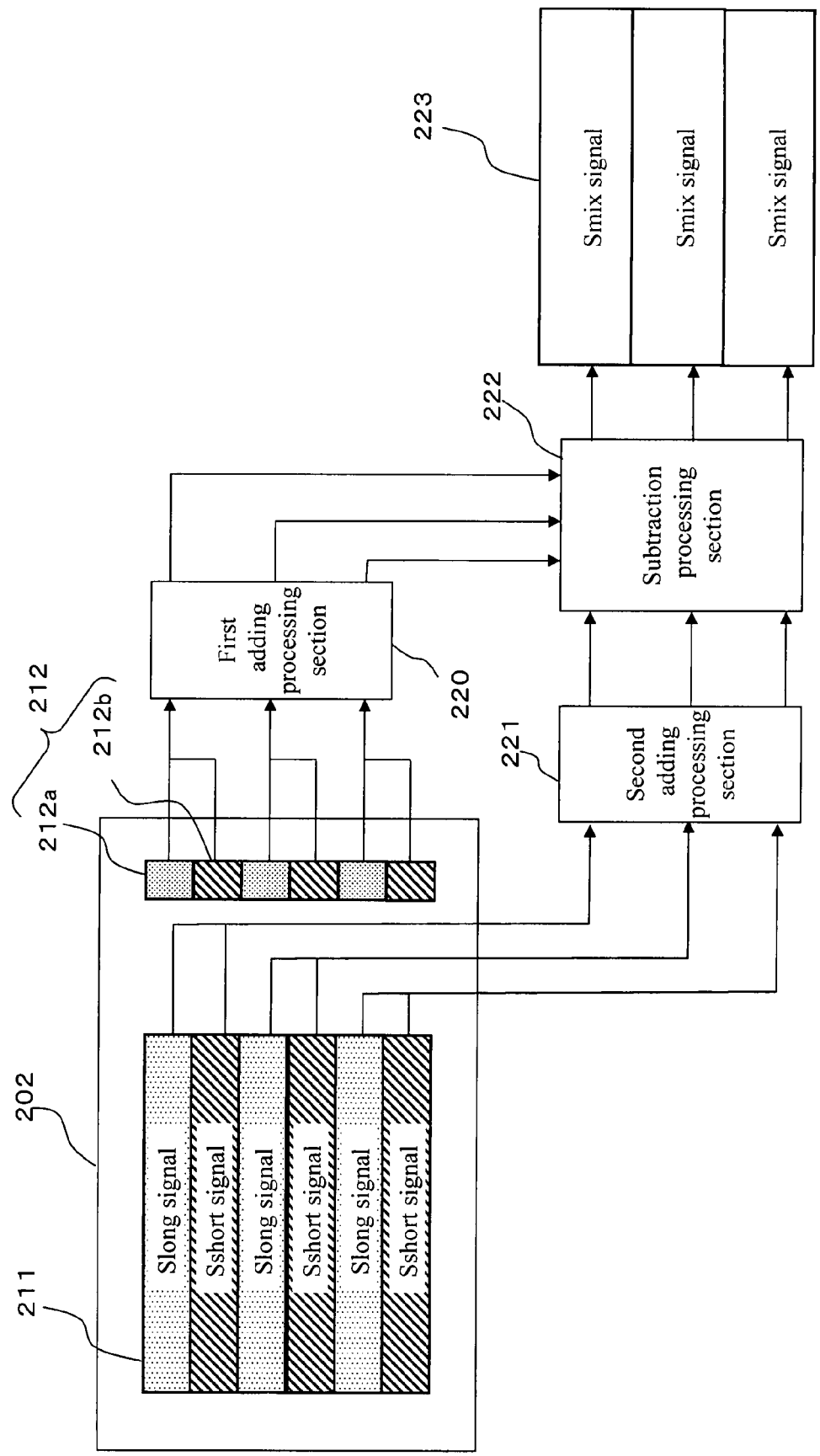
FIG. 10 An illustration for describing OB subtraction processing according to a fifth embodiment of the present invention.

A fifth embodiment of the present invention will be described referring to FIG. 10. The fifth embodiment comprises a first adding processing section 220 and a second adding processing section 221 newly, and it is distinctive in terms of the contents of processing in a subtraction processing section 222.

In the fifth embodiment, the synthesizing processing of the output signals of the OB pixel part 212 corresponding to the first, second line pairs and the synthesizing processing of the output signals (long exposure signal Slong, the short exposure signal Sshort) of the first, second line pairs are performed precedently, and then, the output signal (synthesized) of the OB pixel section 212 is subtracted from the output signal (synthesized) of the first and second line pairs.

This will be described in detail hereinafter. First, the first adding processing section 220 separately performs sampling of the output signal of the OB pixel section 212a (corresponds to the long exposure signal Slong) and the output signal of the OB pixel section 212b (corresponds to the short exposure signal Sshort) with respect to each line, so as to generate the OB components of each of the OB pixel sections 212a and 212b. Thereafter, the first adding processing section 220 performs adding processing to the OB components between the neighboring OB pixel parts 212a, 212b to generate the synthesized OB component and output it to the subtraction processing section 222.

The second adding processing section adds the long exposure signal Slong outputted from the first line pair and the short exposure signal Sshort outputted from the second line pair where both lines are adjacent to each other so as to generate the composite signal Smix and output it to the subtraction processing section 222.

The subtraction processing section 222 subtracts the synthesized OB component from the supplied composite signal Smix so as to extract the effective data 223 of the composite signal Smix.

Sixth Embodiment

Figure 11:
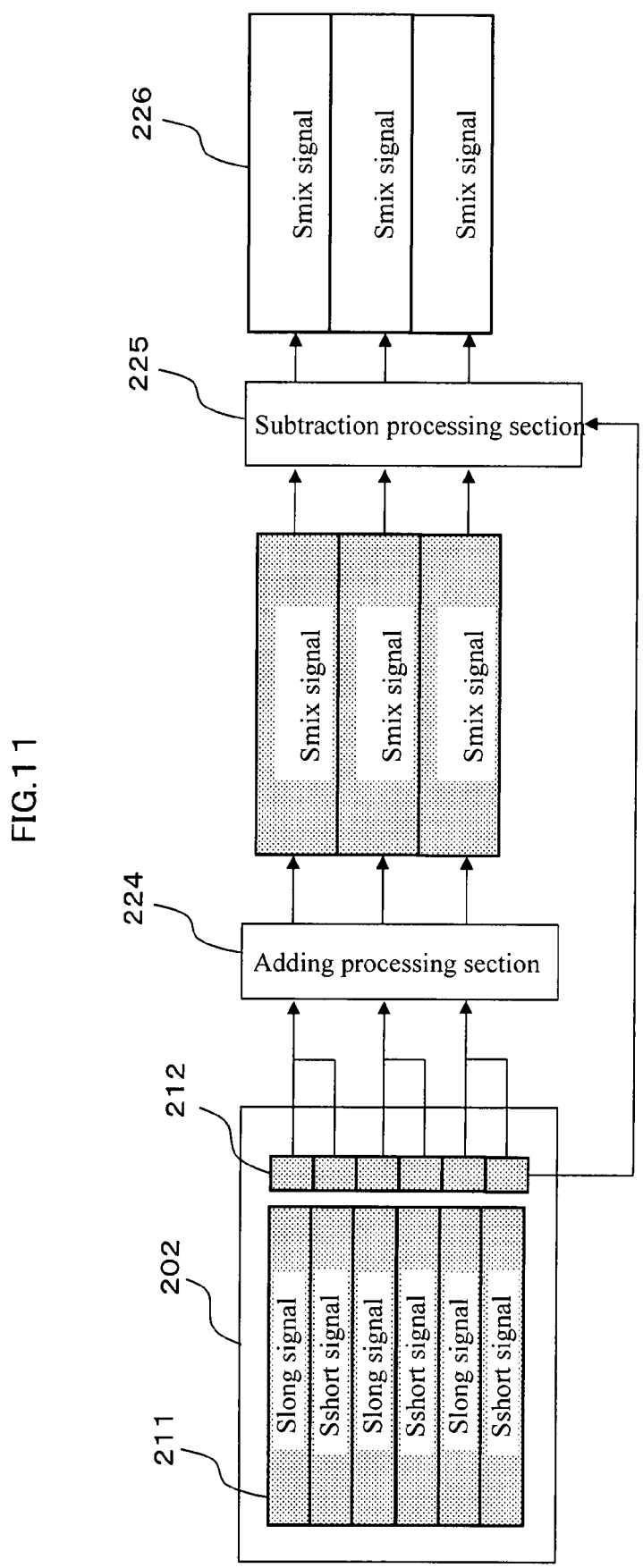
FIG. 11 An illustration describing OB subtraction processing according to a sixth embodiment of the present invention.

A sixth embodiment of the present invention will be described referring to FIG. 11. The sixth embodiment is distinctive in the respect that it comprises an adding processing section 224 and a subtraction processing section 225.

The subtraction processing section 225 obtains the outputs of the OB pixel part 212 not as a line pair unit but as a unit of whole field, and averages the OB components in one field of the screen to perform sampling thereof so as to calculate the field average of the OB components (referred to as the average OB component hereinafter).

The adding processing section 224 adds the output of the first line pair (long exposure signal Slong) and the output of the second line pair (short time exposure signal Sshort) in a state where both contains the OB components so as to generate a composite signal Smix'. The OB component is contained in the composite signal Smix'. Therefore, the subtraction processing section 225 subtracts the average OB component from the composite signal Smix' to extract only the original effective data 226.

The explanation of the embodiments concerning the OB processing according to the present invention is ended by the above ones. Next, embodiments of the present invention regarding WB (White Balance) processing will be described. The WB processing is the processing for correcting the color components of the color filter with a right proportion so that a white object can be photographed as white under any light sources.

In performing the WB processing, the inputted pickup image data is divided into some blocks, and the pixels within each block are integrated by each of the colors that constitute the color filter, i.e. R (red), G (green), and B (blue). Herewith, the proportion of the color components is calculated.

However, in the image sensor of the present invention, when the composite signal Smix is obtained by adding the long exposure signal Slong and the short exposure signal Sshort, the incident light quantity in the line where the long exposure signal Slong is adopted becomes limited to a narrow range if the photographing scene is in dark. Thus, the dynamic range becomes narrow. Therefore, each color component of the obtained block data becomes poor, so that it becomes the data with low accuracy for determining the balance of the colors. So, it is a seventh embodiment of the present invention where the WB processing with high accuracy is achieved.

Seventh Embodiment

Figure 12:
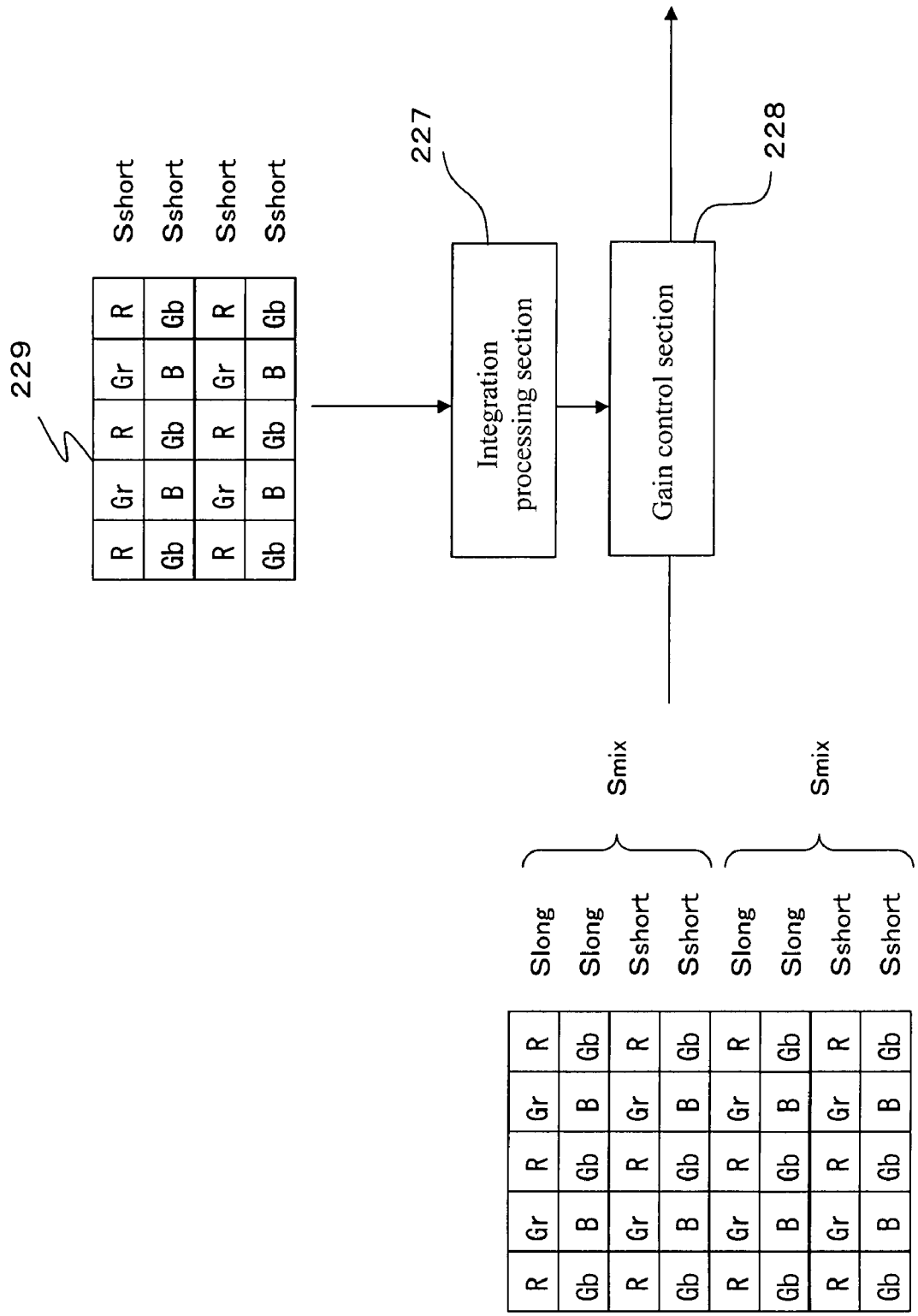
FIG. 12 An illustration describing WB processing according to a seventh embodiment of the present invention.

The seventh embodiment will be described referring to FIG. 12. The seventh embodiment is distinctive in the respect that it comprises an integration processing section 227 and a gain control section 228. The gain control section 228 controls the gain of the composite signal Smix. The integration processing section 227 calculates the gain control data from the output of the exposure area 221, and supplies it to the gain control section 228. Other structures of the seventh embodiment are the same as those of each embodiment described above. Therefore, in FIG. 12, the same reference numerals are applied to the same or similar components as those of FIG. 1-FIG. 11.

In the WB processing according to the structure of the present invention, if the photographing scene is in dark as described above, the information quantity of the color components is insufficient in the line that outputs the long exposure signal Slong. Thus, it becomes difficult to determine the balance of the colors. Therefore, the integration processing section 227 extracts the integrated block data 229 that is formed by selectively extracting the second line pairs (the output lines of the short exposure signal Sshort capable of obtaining sufficient exposed data), from the output signal of the exposure area 211.

The integrated block data 229 extracted in this manner has all the colors R, G, and B, which constitute the color filter. The integration processing section 227 integrates the obtained integrated block data 229 by each color, and supplies the integration result to the gain control section 228. The gain control section 228 executes adjustment processing of the white balance to the composite signal Smix based on the integration result performed by the integration processing section 227.

Herewith, it is possible to obtain the necessary information from the line with a sufficient incident light quantity (the second line pair), and calculate the data for adjusting the balance of the color components.

In each embodiment of the present invention including the seventh embodiment, the exposure area 211 is divided into the first and second line pairs consisting of 2n (n: a natural number) lines respectively, and then the long exposure signal Slong is outputted from the first line pair whereas the short exposure signal Sshort is outputted from the second line pair.

Figure 13A:
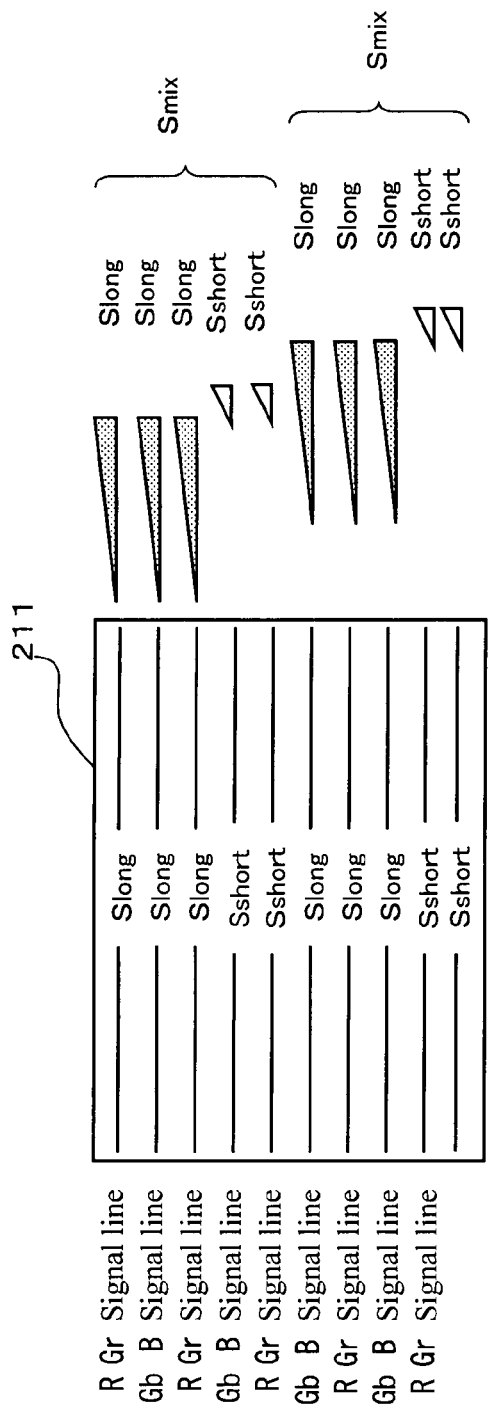
FIG. 13A An illustration describing a method for synthesizing the long exposure signal and the short exposure signal according to the seventh embodiment.

However, as shown in FIG. 13A, while the second line pair is constituted with 2n lines, the first line pair may be constituted with 2n+1 lines unlike the cases of each embodiment described above.

When the first line pair that outputs the long exposure signal Slong is constituted with 2n lines, there are cases where a sufficient incident light quantity cannot be obtained in case of the object with low luminance. In such cases, i.e. in the photographing scene with low luminance, the first line pair is constituted with 2n+1 lines while the second line pair is constituted with 2n lines. Herewith, it becomes possible to obtain a sufficient light quantity inputted to the first line pair. As a result, sensitivity can be improved even in the photographing scene with low luminance.

Figure 13B:
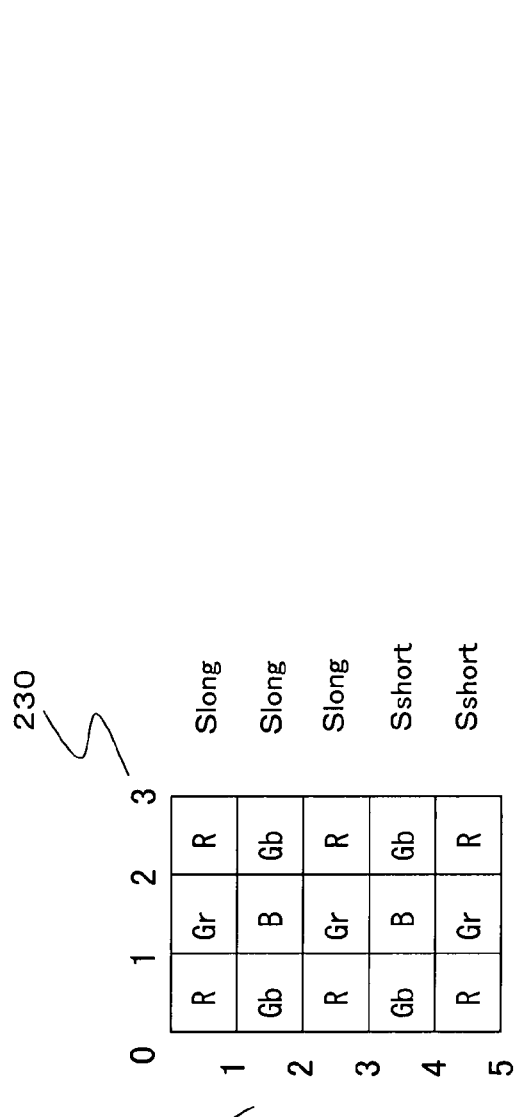
FIG. 13B An illustration showing the relationship between the weight coefficients and the exposure signals according to the seventh embodiment.

Here, the center of mass of each pixel of the R signal, G signal and B signal after the adding processing will be shown in the followings. FIG. 13B illustrates the pixel array in attending to the horizontal three pixels, when the composite signal Smix is obtained by synthesizing the long exposure signal Slong obtained from the first line pairs of three lines and the short exposure signal Sshort obtained from the second line pairs of two lines.

Provided that the weight coefficient in adding the upper part of the pixel array is a horizontal weight coefficient 230, and the weight coefficient in adding the left part of the pixel array is a vertical weight coefficient 231, the center of mass of the horizontal pixel of the R signal, Gr signal, Gb signal, and B signal in the composite signal Smix after the adding processing becomes as follows.

The center of mass of the horizontal pixel (R)=(0.5+2.5)/2=1.5
The center of mass of the horizontal pixel (Gr)=1.5
The center of mass of the horizontal pixel (Gb)=(0.5+2.5)/2=1.5
The center of mass of horizontal pixel (B)=1.5
Similarly, the center of mass of the vertical pixel becomes as follows.
The center of mass of vertical pixel (R)=(0.5+2.5+4.5)/3=2.5
The center of mass of horizontal pixel (Gr)=(0.5+2.5+4.5)/3=2.5
The center of mass of horizontal pixel (Gb)=(1.5+3.5)/2=2.5
The center of mass of horizontal pixel (B)=(1.5+3.5)/2=2.5

As shown above, the center of mass of the pixel becomes equal in all the color signals both horizontally and vertically. Therefore, even if the number of lines of the long exposure signals Slong is increased by setting the number of the first line pairs (output lines of the long exposure signal Slong) as 2n+1, and setting the number of the second line pairs (the output lines of the short exposure signals Sshort) as 2n, the center of mass of the pixel in the generated composite signal Smix is not shifted.

Eighth Embodiment

Figure 14:
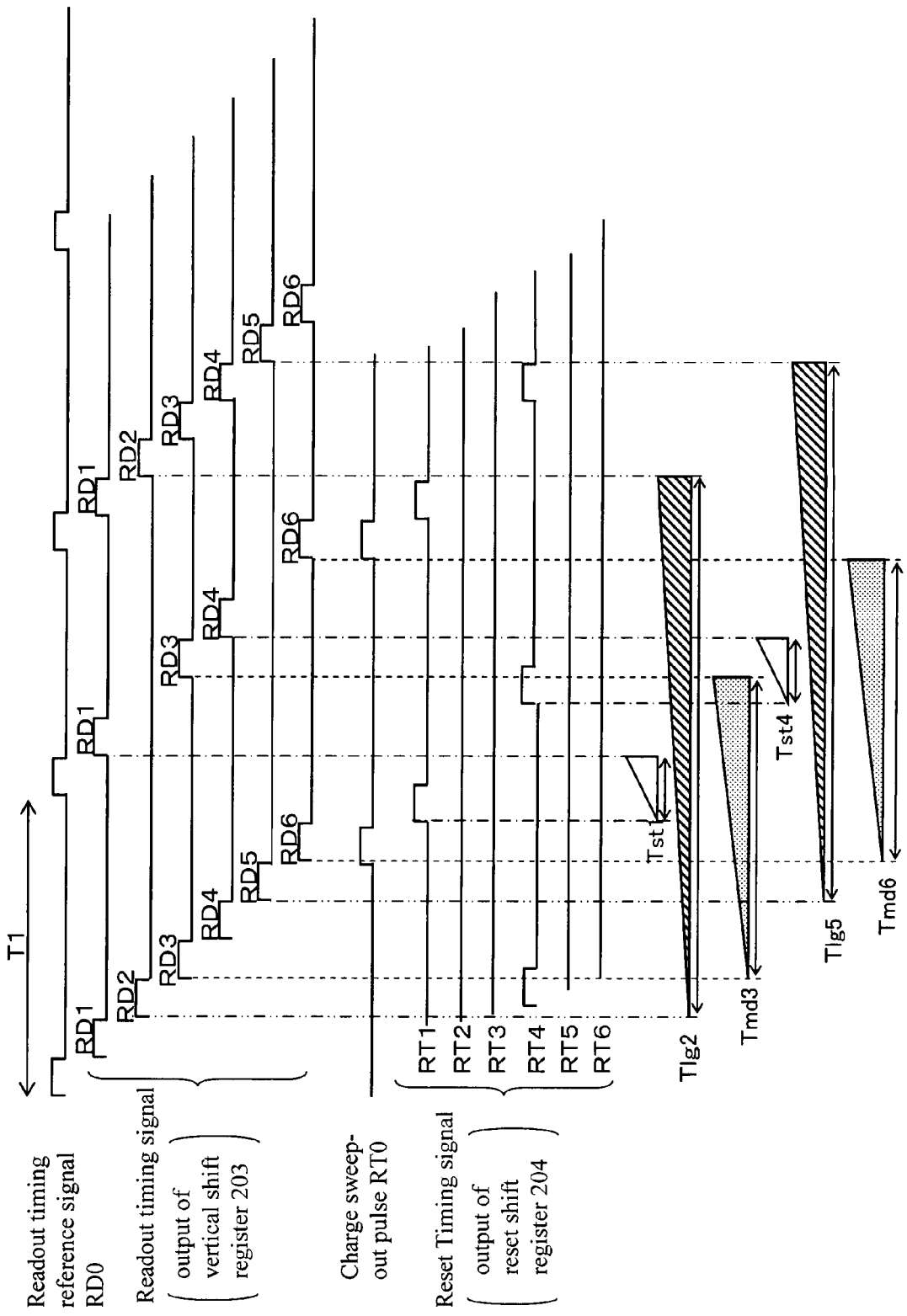
FIG. 14 An illustration describing a mask setting method for a readout timing signal and the output signal according to an eighth embodiment of the present invention.

Next, a description will be given of an eighth embodiment of the present invention where the exposure control is performed by each line, referring to FIG. 14. FIG. 14 is a timing chart of the signal processing according to the eighth embodiment. The structure of the image sensor according to the eighth embodiment is basically the same as the structure of the first embodiment that is described referring to FIG. 2. Therefore, the same reference numerals are applied to the components that are the same or similar to the components of FIG. 2. However, an apostrophe is added to the reference numeral of the component that is the distinctive feature of the eighth embodiment, even though the structure thereof is the same.

As shown in FIG. 14, a signal charge readout control section 206' of the eighth embodiment shifts the readout timing signal RD0 based on the output of the vertical shift register 203 so as to generate the readout timing signals RD1, RD2, RD3, - - - of each line. This operation is not different from those of other embodiments. However, the signal charge readout control section 206' is also provided with a mask setting function which performs setting of "masking valid"/"masking invalid" to the readout timing signals RD1, RD2, RD3, - - - .

The signal charge readout control section 206' performs setting of "masking valid"/"masking invalid" to the output (the readout timing signals RD1, RD2, RD3, - - - ) of the vertical shift register 203. In FIG. 14, the readout timing signals RD2, RD5 are set as "masking valid" by the signal charge readout control section 206'. Herewith, the cycle of the readout timing signals RD2, RD5 becomes the cycle obtained by dividing the cycle of the readout timing signals RD1, RD3, RD4, RD6 by n (n is a natural number). In the case of FIG. 14, the cycle of the readout timing signals RD2, RD5 is a cycle obtained by dividing the cycle of the readout timing signals RD1, RD3, RD4, RD6 by 2.

Further, the reset shift register 204' performs masking to a single or a plurality of reset timing signals RTi (i=1, 2, - - - ) that are selectively extracted, so as to fix those to a flat low level. In the case of FIG. 14, the reset timing signals RT2, RT3, RT5, and RT6 are masked and fixed to a flat low level. Herewith, three kinds of exposure time can be set on a single screen.

In the line (in the case of FIG. 14, the line that is controlled by the reset timing signals RT1 and RT4) where the reset timing signal RTi (i=1, 2, - - -) is outputted without change under "masking invalid" state, The exposure time thereof corresponds to the time from the rise of the reset timing signal RTi (i=1, 2, - - -) to the rise of the readout timing signal RDi (i=1, 2, - - -).

In the meantime, in the line (in the case of FIG. 14, the line that is controlled by the reset timing signals RT2, RT3, RT5, and RT6) where the output of the reset timing signals RTi (i=1, 2, - - -) is blocked by masking, the exposure time thereof depends on whether the readout timing signal RDi (i=1, 2, - - -) is set in "masking valid" state or "masking invalid" state.

That is, in the line (in the case of FIG. 14, the line that is controlled by the readout timing signals RD2, RD3, RD4, and RD6) where the output of the readout timing signals RDi (i=1, 2, - - -) is outputted without change under "masking invalid" state, the exposure time becomes equal to the cycle T1 of the readout timing reference signal RD0. However, as described above, among those lines, in the line (in the case of FIG. 14, the line that is controlled by the reset timing signals RT1 and RT4) where the reset timing signal RTi (i=1, 2, - - -) is unmasked ("masking invalid" state), the exposure time becomes the time from the rise of the reset timing signal RTi (i=1, 2, - - -) to the rise of the readout timing signal RDi (i=1, 2, - - -). Therefore, it is not equal to the cycle T1 of the readout timing reference signal RD0.

From the above description, in the case of FIG. 14, the exposure time of the line controlled by the readout timing signals RD3 and RD6 becomes equal to the cycle t1 of the readout timing reference signal RD0.

The exposure time of the line (in the case of FIG. 14, the line that is controlled by the readout timing signal D2, D5) from which the output of the readout timing signal RDi (i=1, 2, - - -) is controlled by masking becomes the cycle that is n times the cycle of the readout timing reference signal RD0, i.e. the cycle T1×n. In the case of FIG. 14, the exposure time of the line where the output of the readout timing signal RDi (i=1, 2, - - -) is controlled by masking becomes the cycle that is twice the cycle of the readout timing reference signal RD0, i.e. the cycle T1×2.

As just described, the exposure time of each line can be set as the following three kinds through controlling "masking valid"/"masking invalid" and the timing of the readout timing signal and the reset timing signal.

The first exposure time is the exposure period (in the case of FIG. 14, the exposure periods Tmd3, Tmd6) from the rise of the readout timing signal RDi to the rise of the readout timing signal RDi of the next cycle. The second exposure time is the exposure time (the exposure time Tst1, Tst4 in FIG. 14) having the time length from the rise of the reset timing signal RTi to the rise of the readout timing signal RDi. The third exposure time is the exposure time (in the case of FIG. 14, the exposure time Tlg2, Tlg6) having the time length that is n times of the readout timing reference signal RD0.

The time length (the exposure periods Tmd3, Tmd6) of the first exposure time is set in accordance with the luminosity of the screen part that is judged relatively dark in the screen area of the area sensor 202. The time length (the exposure time Tst1, Tst4) of the second exposure time is set in accordance with the luminosity of the screen part that is judged relatively bright in the screen area of the area sensor 202. The time length (the exposure time Tlg2, Tlg5) of the third exposure time is set in accordance with the luminosity of the screen part that is judged as the darkest part in the screen area of the area sensor 202.

As just described, it is possible according to the eighth embodiment to set three kinds of exposure time, i.e. Slong (the third exposure time), Sshort (the second exposure time), and Smiddle (the first exposure time), on a single screen through controlling the "masking valid"/"masking invalid" state and the pulse output timing of the readout timing signal and the reset timing signal.

Ninth Embodiment

In the above-described first embodiment and the like, the layout order of the output lines of the long exposure signal Slong and the output lines of the short exposure signal Sshort is the same in each field. In the ninth embodiment, however, the layout order of the output lines of the long exposure signal Slong and the output lines of the short exposure signal Sshort is switched alternately by each field.

Figure 15:
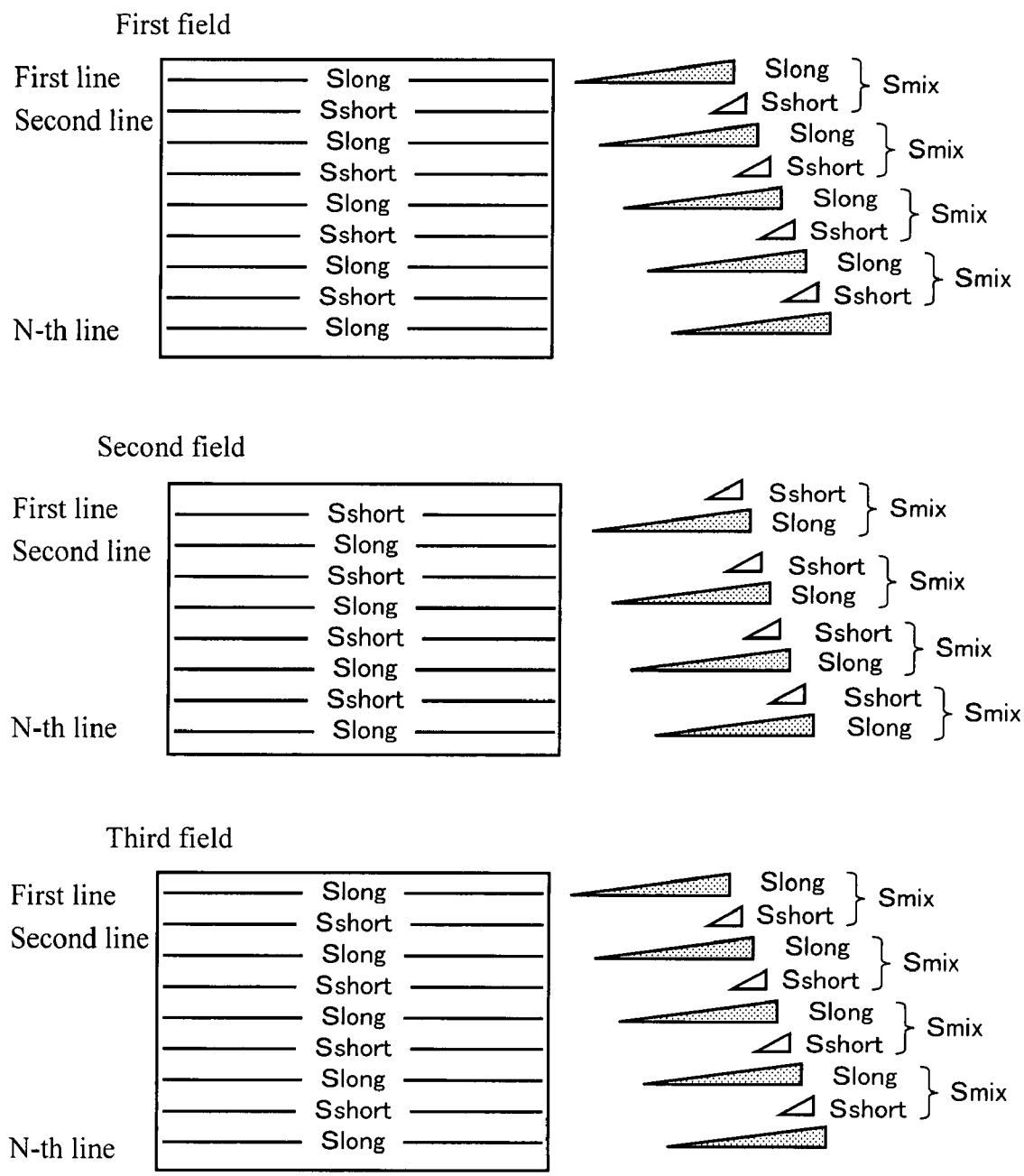
FIG. 15 An illustration describing the output line of the long exposure signal and the output line of the short exposure signal according to a ninth embodiment of the present invention.
Figure 16:
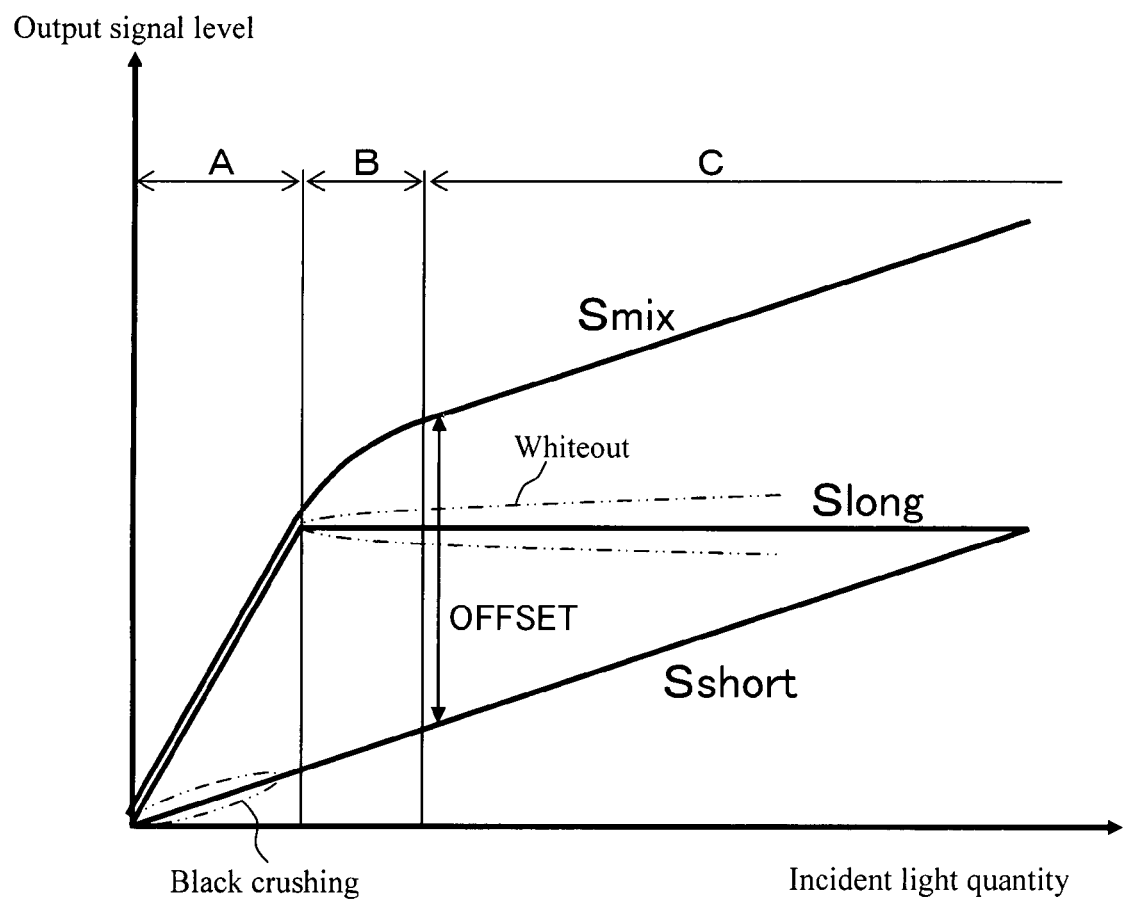
FIG. 16 An illustration describing the relationship between the incident light quantity and the output signal level in the long exposure signal and the short exposure signal.

In the structure shown in FIG. 15, the odd-number lines (correspond to the first line pairs) in the odd-number field are set as the output lines of the long exposure signal Slong, and the even-number lines (correspond to the second line pairs) are set as the output lines of the short exposure signal Sshort. Inversely, the odd-number lines (correspond to the first line pairs) in the even-number field are set as the output lines of the short exposure signal Sshort, and the even-number lines (correspond to the second line pairs) are set as the output lines of the long exposure signal Slong.

Furthermore, in each of the embodiments described above, memories by a field unit (referred to as a field memory hereinafter) become unnecessary by improving on the recording control of the line memory. This will be described in the followings.

In the conventional structure, after accumulating each of the long exposure signal Slong and the short exposure signal Short by one field, the next processing is carried out. That is, the signal of the first line in the first field stored in the field memory is added to the output signal of the first line of the second field so as to output the composite signal, and the output signal of the second line of the first field stored in the field memory is added to the output signal of the second line of the second field so as to output the composite signal. This operation is repeated to synthesize the signals of the two fields in order to prepare an image of high dynamic range. In order to perform such processing, field memories by at least one field are necessary.

On the contrary, in each of the embodiments according to the present invention, it is possible to achieve the similar high dynamic range by simply securing the memories of line unit (referred to as line memories hereinafter). A specific method therefor will be described hereinafter.

In the image sensor 101 to which the Bayer-type filter array 210 shown in FIG. 6A is applied, the output of the long exposure signal Slong and the output of the short exposure signal Sshort are controlled by a line unit, as shown in FIG. 6B. In this case, it is possible to generate a composite signal Smix by securing the line memory corresponding to three lines. That is, when the data of the odd-number line in one of the line pair is stored in the memory area of the first column of the line memory (for three lines), the data of the odd-number line in the other line of the line pair is stored in the memory area of the third column of the line memory. Similarly, when the data of the even-number line in one of the line pair is stored in the memory area of the first column of the line memory (for three lines), the data of the even-number line in the other line of the line pair is stored in the memory area of the third column of the line memory.

By the use of such line memory, it is possible to generate the composite signal Smix by adding the R, Gr signals of the odd-number line of the first line pair and the R, Gr signals of the odd-number line of the second line pair with a single line memory. Similarly, it is possible to generate the composite signal Smix by adding the R, Gr signals of the even-number line of the first line pair and the R, Gr signals of the even-number line of the second line pair. By repeating this operation, an image of the high dynamic range is generated within the signals of one field. As just described, it becomes possible in each of the embodiments of the present invention to perform the adding processing of the long exposure signal Slong and the short exposure signal Sshort by securing the memory of a line unit. Thus, it needs no field memory.

INDUSTRIAL APPLICABILITY

The image sensor of the present invention is preferable for photographing the object that is moving in a wide dynamic range without a blur in the image, and it is effective as the image sensor of a digital video camera, a portable telephone with a built-in camera or the like.

The invention claimed is:

1. An image sensor readout method for reading out signal charges from an area sensor where a plurality of image pickup elements are arranged in matrix, the signal charges being accumulated in said plurality of image pickup elements, wherein:
   a first exposure time and second exposure time different in time length from each other are set, and thereafter each of said first exposure time and said second exposure time is then allocated individually to each line of said area sensor;
   said first exposure time and said second exposure time within one field is set based on a readout timing signal for each line generated by shifting a readout timing reference signal by a first shift register and a reset timing signal for each line generated by shifting a charge sweep-out pulse signal by a second shift register, wherein said first exposure time and said second exposure time set for each one line within one field is made different in time length depending on whether or not said reset timing signal for said each line is masked;
   said signal charges accumulated in said image pickup elements in said allocated first exposure time and second exposure time are read out more than once in a cycle of said readout timing reference signal per line of said area sensor in accordance with said readout timing reference signal;
   an OB component, which is read out along with said signal charges from an optical black pixel arranged in each line of said area sensor, is computed; and
   said computed result of said OB component is subtracted from said signal charges being read out or from a computed result of said signal charges, and the subtracted result is synthesized per screen of said area sensor.

2. The image sensor readout method according to claim 1, wherein:
   said area sensor is divided into first and second line pairs that are arranged alternately;
   said first and second line pairs are constituted with a single or a plurality of lines; and
   said first exposure time is set to a group of said first line pairs, and said second exposure time is set to a group of said second line pairs.

3. The image sensor readout method according to claim 2, wherein said signal charges read out from said first line pair and said signal charges read out from said second line pair are synthesized per line.

4. The image sensor readout method according to claim 2, wherein number of lines constituting said first and second line pairs is set as 2n, where n is a natural number, and synthesis between same colors in a Bayer-type color filter is achieved.

5. The image sensor readout method according to claim 4, wherein number of lines of said first line pair is set as 2n+1, where n is a natural number.

6. The image sensor readout method according to claim 1, wherein:
   time length of said first exposure time is set in accordance with luminosity of a screen part that is judged relatively dark in a screen area of said area sensor; and
   time length of said second exposure time is set in accordance with luminosity of a screen part that is judged relatively bright in a screen area of said area sensor.

7. The image sensor readout method according to claim 6, wherein:
   said time length of said first exposure time is set as same as a signal cycle of said readout timing reference signal; and
   said time length of said second exposure time is set shorter than said signal cycle of said readout timing reference signal.

8. The image sensor readout method according to claim 1, wherein said line to which said first exposure time is set and said line to which said second exposure time is set are switched with respect to each field.

9. The image sensor readout method according to claim 1, wherein:
   third exposure time is further set;
   time length of said first exposure time is set in accordance with luminosity of a screen part that is judged relatively dark in a screen area of said area sensor;
   time length of said second exposure time is set in accordance with luminosity of a screen part that is judged relatively bright in said screen area of said area sensor; and
   time length of said third exposure time is set in accordance with luminosity of a screen part that is judged as a darkest part in said screen area of said area sensor.

10. The image sensor readout method according to claim 1, wherein the OB component is subtracted per line from said signal charges that are read out from said area sensor per line.

11. The image sensor readout method according to claim 1, wherein:
   an average OB component is prepared by averaging OB components corresponding to one field;
   independent coefficients of said first and second exposure time in said average OB component are obtained based on a ratio between said first exposure time and said second exposure time;
   multiplication result of said average OB component and said independent coefficient of said first exposure time is subtracted from said signal charges that are read out from lines to which said first exposure time is set, so as to extract exclusively a signal component at the set lines for said first exposure time; and
   a multiplication result of said average OB component and said independent coefficient of said second exposure time is subtracted from said signal charges that are read out from lines to which said second exposure time is set, so as to extract exclusively a signal component at the set lines for said second exposure time.

12. The image sensor readout method according to claim 1, wherein:
- a composite OB component is generated by adding said OB component read out from a line to which said first exposure time is set and said OB component read out from a line, adjacent to a line to which said first exposure time is set, to which said second exposure time is set;
- a composite signal is generated by adding said signal charge containing said OB component that is read out from a line to which said first exposure time is set and said signal charge containing said OB component that is read out from a line, adjacent to a line to which said first exposure time is set, to which said second exposure time is set; and
- said composite OB component is subtracted from said composite signal with respect to each line so as to extract only a signal component.

13. The image sensor readout method according to claim 1, wherein:
- an average OB component is generated by averaging OB components of one field;
- a composite signal is generated by adding said signal charge containing said OB component that is read out from a line to which said first exposure time is set and said signal charge containing said OB component that is read out from a line to which said second exposure time is set; and
- said average OB component is subtracted from said composite signal so as to extract only a signal component.

14. The image sensor readout method according to claim 1, wherein:
- block data is obtained from said signal charge that is read out from a line to which said second exposure time is set, and obtained said block data is integrated by each color; and
- a proportion of color components is corrected based on a integrating result of said block data in order to achieve white balance.

* * * * *